US012664941B2

(12) United States Patent
Park et al.

(10) Patent No.: US 12,664,941 B2
(45) Date of Patent: Jun. 23, 2026

(54) PIXEL, DISPLAY DEVICE INCLUDING THE PIXEL AND METHOD FOR OPERATING THE DISPLAY DEVICE

(71) Applicant: LG Display Co., Ltd., Seoul (KR)

(72) Inventors: Minseon Park, Paju-si (KR); Sanghee Yu, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/217,174

(22) Filed: May 23, 2025

(65) Prior Publication Data

US 2026/0018128 A1 Jan. 15, 2026

(30) Foreign Application Priority Data

Jul. 15, 2024 (KR) ........................ 10-2024-0092841

(51) Int. Cl.
*G09G 3/3233* (2016.01)
*G09G 3/32* (2016.01)

(52) U.S. Cl.
CPC ............ *G09G 3/3233* (2013.01); *G09G 3/32* (2013.01); *G09G 2300/043* (2013.01); *G09G 2300/0819* (2013.01); *G09G 2310/08* (2013.01); *G09G 2320/0233* (2013.01); *G09G 2320/0247* (2013.01); *G09G 2330/021* (2013.01)

(58) Field of Classification Search
CPC ...... G09G 3/32; G09G 3/3233; G09G 3/3266; G09G 2300/043; G09G 2300/0819; G09G 2310/08; G09G 2320/0233; G09G 2320/0247; G09G 2330/021
See application file for complete search history.

(56) References Cited

U.S. PATENT DOCUMENTS

2013/0120228 A1* 5/2013 Yoon .................... G09G 3/3233 345/80
2015/0077413 A1* 3/2015 Kim ..................... G09G 3/3258 345/212
2015/0379923 A1* 12/2015 Lee .................. H10K 59/1315 345/82
2018/0005575 A1* 1/2018 Lee ...................... G09G 3/3225
2018/0005576 A1* 1/2018 Yoon .................... G09G 3/3233
2018/0005601 A1* 1/2018 Kim ..................... G09G 3/3266
(Continued)

FOREIGN PATENT DOCUMENTS

KR 10-2097473 B1 4/2020
KR 10-2023-0009290 A 1/2023

*Primary Examiner* — Vinh T Lam
(74) *Attorney, Agent, or Firm* — Fenwick & West LLP

(57) ABSTRACT

Disclosed is a pixel, including: a light emitting diode; a driving transistor connected between a high potential driving voltage line and a first node and having a gate electrode connected to a second node; a switching transistor connected between a data line and the second node and having a gate electrode that receives a first scan signal; an initialization transistor connected between a reference voltage line and the second node and having a gate electrode that receives a second scan signal; a first capacitor connected between the first node and the second node; a second capacitor having one electrode connected to the first node; a third capacitor connected between the first node and the reference voltage line; and a compensation transistor connected between the third capacitor and the reference voltage line and having a gate electrode that receives a fourth scan signal.

19 Claims, 18 Drawing Sheets

(56) References Cited

U.S. PATENT DOCUMENTS

| | | | | |
|---|---|---|---|---|
| 2018/0006263 | A1* | 1/2018 | Yoon | H10K 59/80516 |
| 2023/0008071 | A1* | 1/2023 | Heo | G09G 3/3291 |
| 2023/0008552 | A1* | 1/2023 | Kim | G09G 3/3233 |
| 2023/0009113 | A1* | 1/2023 | Son | G09G 3/3266 |
| 2023/0070020 | A1* | 3/2023 | Son | G09G 3/3266 |
| 2023/0119036 | A1* | 4/2023 | Hwang | G09G 3/2081 345/204 |
| 2023/0154372 | A1* | 5/2023 | Hwang | G09G 3/2011 345/691 |
| 2023/0189605 | A1* | 6/2023 | Ryoo | G09G 3/3266 257/40 |
| 2024/0169906 | A1* | 5/2024 | Wang | G09G 3/3233 |
| 2024/0257732 | A1* | 8/2024 | Sun | G09G 3/2007 |
| 2026/0045216 | A1* | 2/2026 | Lee | G09G 3/3233 |

* cited by examiner

PIXEL, DISPLAY DEVICE INCLUDING THE PIXEL AND METHOD FOR OPERATING THE DISPLAY DEVICE

CROSS REFERENCE TO RELATED APPLICATION

The present application claims priority to Republic of Korea Patent Application No. 10-2024-0092841, filed on Jul. 15, 2024, which is hereby incorporated by reference in its entirety.

FIELD

The present disclosure relates to a pixel, a display device including a pixel and a method for operating the display device.

BACKGROUND

A pixel of a display device includes a light emitting diode and a driving circuit configured to drive the light emitting diode. The light emitting diode may be selected variously according to the kinds of the display device, however, recently, an organic light emitting diode (OLED) having a fast response speed and excellent light emission efficiency, luminance, viewing angle, contrast range and color reproducibility is actively used.

The light emitting diode has an anode electrode connected to a driving circuit, and a cathode electrode connected to a low potential driving voltage. Such a light emitting diode may receive a driving current in correspondence with a voltage of the anode electrode determined through the driving circuit and may emit light at luminance corresponding to the driving current.

At this instance, a voltage of the anode electrode cannot be charged sufficiently to a required voltage because of voltage coupling (parasitic capacitance) between circuit elements of the driving circuit, for example, a capacitor and the anode electrode. This may lead to occurrence of uniformity deterioration and smear in low grayscale. In addition, this may lead to increase of current sensitivity when the display device is driven at a high temperature, thereby resulting in the image quality deterioration.

SUMMARY

The embodiments described herein provide a pixel, which minimizes or removes the voltage coupling between the anode electrode of the light emitting diode and the driving circuit, a display device including the pixel and a method for operating the display device.

The embodiments described herein provide a pixel, which removes the voltage coupling between the anode electrode of the light emitting diode and the storage capacitor, a display device including the pixel and a method for operating the display device.

The embodiments described herein provide a pixel, which has a capacitor connected between one electrode of the driving transistor and the driving voltage and compensates the voltage of the anode electrode by floating the capacitor while boosting the voltage of the anode electrode of the light emitting diode, a display device including the pixel and a method for operating the display device.

The embodiments described herein provide a pixel, which compensates a threshold voltage of the driving transistor, a display device including the pixel and a method for operating the display device.

The embodiments described herein provide a pixel, which can minimize or at least reduce current leakage by using an oxide semiconductor thin film transistor, a display device including the pixel and a method for operating the display device.

In one embodiment, a pixel includes: a light emitting diode; a driving transistor connected between a high potential driving voltage line and a first node and having a gate electrode connected to a second node; a switching transistor connected between a data line and the second node and having a gate electrode configured to receive a first scan signal; an initialization transistor connected between a reference voltage line and the second node and having a gate electrode configured to receive a second scan signal; a first capacitor connected between the first node and the second node; a second capacitor having one electrode connected to the first node; a third capacitor connected between the first node and the reference voltage line; and a compensation transistor connected between the third capacitor and the reference voltage line and having a gate electrode configured to receive a fourth scan signal, The third capacitor may store a voltage corresponding to a threshold voltage of the driving transistor while the compensation transistor is turned on during a non-emission period of the light emitting diode, and the third capacitor may be floated while the compensation transistor is turned off during an emission period of the light emitting diode.

The fourth scan signal may be applied in a turn-on level during the non-emission period of the light emitting diode and may be applied in a turn-off level during the emission period of the light emitting diode.

The pixel may further include: a first light emitting transistor connected between the high potential driving voltage line and the driving transistor and having a gate electrode configured to receive a first light emission signal; a second light emitting transistor connected between the first node and the light emitting diode and having a gate electrode configured to receive a second light emission signal; and an anode initialization transistor connected between the light emitting diode and a bias voltage line and having a gate electrode configured to receive a third scan signal.

The fourth scan signal may be applied in a turn-on level when the second light emission signal is applied in a turn-off level, and the fourth scan signal may be applied in a turn-off level when the second light emission signal is applied in a turn-on level.

The driving transistor, the switching transistor, the initialization transistor, the compensation transistor, the first and second light emitting transistors may be oxide thin film transistors.

An area of the second capacitor and an area of the third capacitor may be smaller than an area of the first capacitor.

The pixel may include: a substrate; a first insulation layer disposed on the substrate; a first storage electrode disposed on the first insulation layer; a second insulation layer formed on the first storage electrode; second to fourth storage electrodes disposed on the second insulation layer and having at least one region thereof, respectively, overlapping the first storage electrode; a third insulation layer formed on the second to fourth storage electrodes; fifth and sixth storage electrodes formed on the third insulation layer and overlapping the second and fourth storage electrodes, respectively; a fourth insulation layer formed on the fifth and sixth storage electrodes; the driving transistor formed on the fourth insulation layer; and the light emitting diode disposed on the driving transistor.

The first, fourth and sixth storage electrodes may configure the first capacitor, the first and third storage electrodes may configure the second capacitor, and the first, second and fifth storage electrodes may configure the third capacitor.

Another electrode of the second capacitor may be connected to the high potential driving voltage or a capacitor driving voltage.

In one embodiment, a display device includes: a display panel having an arrangement of pixels; a data driver configured to apply a data voltage to the pixels; a gate driver configured to apply first to fourth scan signals and first and second light emission signals to the pixels; and a timing controller configured to control an operation timing of the data driver and the gate driver.

Each of the pixels may include: a light emitting diode; a driving transistor connected between a high potential driving voltage line and a first node and having a gate electrode connected to a second node; a switching transistor configured to apply the data voltage to the second node in response to the first scan signal; an initialization transistor configured to apply a reference voltage to the second node in response to the second scan signal; an anode initialization transistor configured to apply a bias voltage to the light emitting diode in response to the third scan signal; a first light emitting transistor connecting the high potential driving voltage line and the driving transistor to each other in response to the first light emission signal; a second light emitting transistor connecting the first node and the light emitting diode to each other in response to the second light emission signal; a first capacitor connected between the first node and the second node; a second capacitor having one electrode connected to the first node; a third capacitor connected between the first node and a reference voltage line; and a compensation transistor connecting the third capacitor and the reference voltage line to each other in response to the fourth scan signal.

The gate driver may apply the fourth scan signal in a turn-on level while applying the second light emission signal in a turn-off level and apply the fourth scan signal in a turn-off level while applying the second light emission signal in a turn-on level.

The third capacitor may store a voltage corresponding to a threshold voltage of the driving transistor while the compensation transistor is turned on in response to the fourth scan signal and may be floated while the compensation transistor is turned off in response to the fourth scan signal.

The display panel may include a display region in which the pixels are disposed and a non-display region disposed around the display region, and the gate driver may include: shift registers disposed on left and right sides of the display region in the non-display region, and configured in a form symmetrical to each other on left and right sides.

The shift registers may include: a first shift register configured to output the first scan signal; a second shift register configured to output the second scan signal; a third shift register configured to output the third scan signal; a fourth shift register configured to output the fourth scan signal; a fifth shift register configured to output the first light emission signal; and a sixth shift register configured to output the second light emission signal.

The third shift register may be disposed adjacent to the display region, the fourth shift register may be disposed farthest to the display region, and the first to fourth shift registers may be disposed to be adjacent to one among the fifth shift register and the sixth shift register.

Still another embodiment is a method for operating a display device including a display panel having an arrangement of a pixel; a data driver configured to apply a data voltage to the pixel; a gate driver configured to apply a scan signal and a light emission signal to the pixel; and a timing controller configured to control an operation timing of the data driver and the gate driver.

In a refresh period in one frame, the method may include: an initializing step for the gate driver to apply the second scan signal, the third scan signal, a fourth scan signal, and the second light emission signal in a turn-on level; a sampling step for the gate driver to convert the second light emission signal into a turn-off level and apply the first light emission signal in the turn-on level; a programming step for the gate driver to convert the second scan signal and the first light emission signal into the turn-off level, and apply the first scan signal in the turn-on level, and for allowing the data driver to apply the data voltage; a boosting step for the gate driver to convert the first scan signal, the third scan signal, and the fourth scan signal into the turn-off level, and convert the first light emission signal and the second light emission signal into the turn-on level; and a light emitting step for the pixel to emit light at luminance corresponding to the data voltage.

In a skip period of the one frame, the method may further include: an anode initializing step for the gate driver to apply the third scan signal and the second light emission signal in the turn-on level, and apply the first light emission signal in the turn-off level; a boosting step for the gate driver to convert the third scan signal into the turn-off level and convert the first light emission signal into the turn-on level; and a light emitting step for the pixel to emit light at luminance corresponding to the data voltage.

The pixel may include: a light emitting diode; a driving transistor connected between a high potential driving voltage line and a first node and having a gate electrode connected to a second node; a switching transistor connected between a data line and the second node and having a gate electrode configured to receive a first scan signal; an initialization transistor connected between a reference voltage line and the second node and having a gate electrode configured to receive a second scan signal; a first light emitting transistor connected between the high potential driving voltage line and the driving transistor and having a gate electrode configured to receive a first light emission signal; a second light emitting transistor connected between the first node and the light emitting diode and having a gate electrode configured to receive a second light emission signal; an anode initialization transistor connected between the light emitting diode and a bias voltage line and having a gate electrode configured to receive a third scan signal; a first capacitor connected between the first node and the second node; a second capacitor having one electrode connected to the first node; a third capacitor connected between the first node and the reference voltage line; and a compensation transistor connected between the third capacitor and the reference voltage line and having a gate electrode configured to receive a fourth scan signal.

The third capacitor may store a voltage corresponding to a threshold voltage of the driving transistor while the compensation transistor is turned on during a non-emission period of the light emitting diode, and the third capacitor may be floated while the compensation transistor is turned off during an emission period of the light emitting diode.

The pixel, the display device including the pixel and the method for operating the display device according to the embodiments may prevent a problem of luminance distortion or display quality deterioration caused by delay of the voltage boosting of the anode electrode of the light emitting diode because of the voltage coupling.

The pixel, the display device including the pixel and the method for operating the display device according to the embodiments may minimize or at least reduce an influence of the voltage coupling due to a compensation capacitor while sizes of the storage capacitor and the light emitting diode are not reduced.

The pixel, the display device including the pixel and the method for operating the display device according to the embodiments may prevent delay of light emission of the light emitting diode and improve the image quality by making the light emitting diode not only quickly reach the required luminance but also be quickly turned on in a boosting period in the emission period.

The pixel, the display device including the pixel and the method for operating the display device according to the embodiments may minimize current leakage by using the oxide semiconductor thin film transistor.

DETAILED DESCRIPTION

Figure 1:
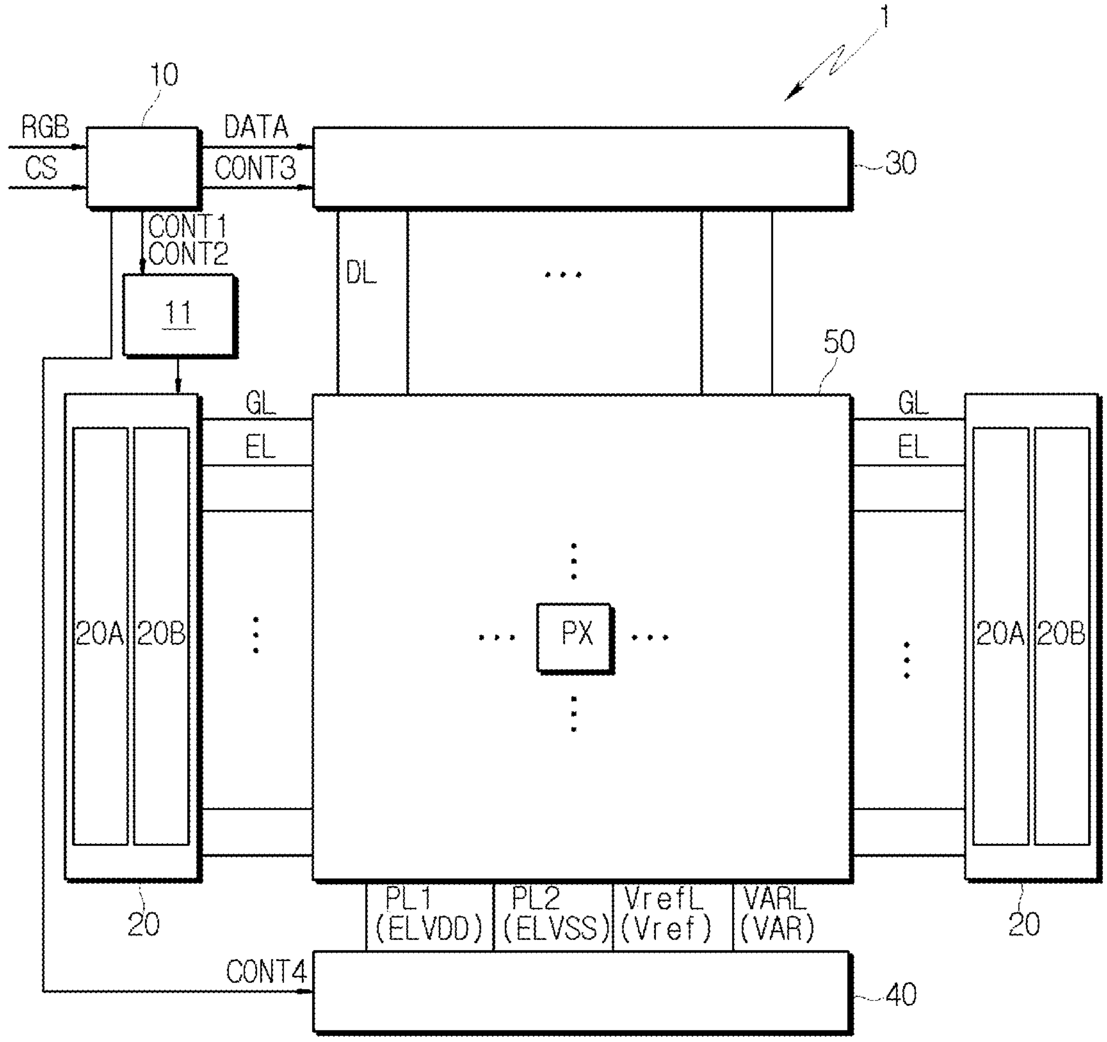
FIG. 1 is a block diagram illustrating a configuration of a display device according to an embodiment.

Hereinafter, embodiments of the disclosure will be described with reference to the drawings. In this specification, when it is mentioned that a component (or, an area, a layer, a part, etc.) is referred to as being "on", "connected to" or "combined to" another component, this means that the component may be directly on, connected to, or combined to the other component or a third component therebetween may be present.

Like reference numerals refer to like elements. Additionally, in the drawings, the thicknesses, proportions, and dimensions of components are exaggerated for effective description. "And/or" includes all of one or more combinations defined by related components.

It will be understood that the terms "first" and "second" are used herein to describe various components but these components should not be limited by these terms. The above terms are used only to distinguish one component from another. For example, a first component may be referred to as a second component and vice versa without departing from the scope of the disclosure. The singular expressions include plural expressions unless the context clearly dictates otherwise.

In addition, terms such as "below", "the lower side", "on", and "the upper side" are used to describe a relationship of configurations shown in the drawing. The terms are described as a relative concept based on a direction shown in the drawing.

In various embodiments of the disclosure, the term "include," "comprise," "including," or "comprising," specifies a property, a fixed number, a step, a process, an element and/or a component, or a combination thereof, but does not exclude presence or addition of other properties, fixed numbers, steps, processes, elements and/or components, or a combination thereof.

FIG. 1 is a block diagram illustrating a configuration of a display device according to an embodiment.

Referring to FIG. 1, a display device 1 includes a timing controller 10, a level shifter 11, a gate driver 20, a data driver 30, a power supply unit 40 (e.g., a circuit), and a display panel 50.

The timing controller 10 may control an operation timing of the gate driver 20 and the data driver 30. The timing controller 10 may receive an image signal RGB and a control signal CS from an external host system, and the like. The image signal RGB may include a plurality of grayscale data. The control signal CS may include, for example, a horizontal synchronization signal, a vertical synchronization signal and a main clock signal.

The timing controller 10 processes the image signal RGB and the control signal CS to be suitable to operational conditions of the display panel 50, and may generate and output image data DATA, a gate driving control signal CONT1, an emission driving control signal CONT2, a data driving control signal CONT3, and a power supply control signal CONT4.

The level shifter 11 may output a gate start signal, and a clock signal (for example, a gate clock signal, an emission clock signal, and the like) to the gate driver 20 based on the gate driving control signal CONT1 and the emission driving control signal CONT2 input from the timing controller 10.

The gate driver 20 may include a scan driving circuit 20A configured to generate scan signals based on signals output from the level shifter 11. The scan driving circuit 20A may provide the generated scan signals to the pixels PX through a plurality of scan lines GL. In an embodiment, one pixel PX may be configured to receive a plurality of scan signals having different waveforms. In such an embodiment, the scan driving circuit 20A may provide the plurality of scan signals to the pixels PX through the scan lines GL corresponding thereto, respectively.

The gate driver 20 may further include a light emission driving circuit 20B configured to generate light emission control signals based on the signals output from the level shifter 11. The light emission driving circuit 20B may provide the generated light emission control signals to the pixels PX through light emission lines EL.

The gate driver 20 may be configured in a Gate-In-Panel form in which the gate driver 20 is mounted on the display panel 50. The gate driver 20 may be disposed on one side of the display panel 50, or on both sides (for example, left and right sides) of the display panel 50 as illustrated. According to a driving method, a panel design manner, and the like, the gate driver 20 may be disposed on both sides (for example, left and right sides) of the display panel 50, or may be connected to two or more side surfaces among four side surfaces of the display panel 50.

The data driver 30 may generate data signals based on the data driving control signal CONT3 and image data DATA output from the timing controller 10. The data driver 30 may provide the generated data signals to the pixels PX through a plurality of data lines DL.

The power supply unit 40 may generate a high potential driving voltage ELVDD and a low potential driving voltage ELVSS to be provided to the display panel 50 based on the power supply control signal CONT4. The power supply unit 40 may provide the generated driving voltages ELVDD and ELVSS to the pixels PX through corresponding power lines PL1 and PL2. In addition, the power supply unit 40 may further generate a reference voltage Vref and/or a bias voltage VAR required for driving the pixel PX and provide it to the pixels PX through a corresponding voltage line VrefL and VARL.

On the display panel 50, a plurality of pixels PX (or referred to as sub-pixels) may be disposed. The pixels may be disposed, for example, in a matrix form on the display panel 50. The pixels disposed in one pixel row are connected to the same scan line GL and light emission line EL, and the pixels disposed in one pixel column are connected to the same data line DL. The pixels PX may emit light at luminance corresponding to a data signal and a scan signal supplied through the scan line GL and the data line DL in response to a light emission control signal applied through the light emission line EL.

In an embodiment, each pixel PX may display one color among red, green and blue. In another embodiment, each pixel PX may display one color among cyan, magenta and yellow. In various embodiments, each pixel PX may display one color among red, green, blue and white.

In an embodiment, the display device 1 may operate in a variable refresh rate mode in which a driving frequency variation is possible. For example, the display device 1 may operate in a refresh rate higher or lower than a predetermined reference refresh rate. The driving of the display device 1 at a refresh rate lower than the reference refresh rate may be referred to as 'low-speed driving', and the driving of the display device 1 at a refresh rate higher than the reference refresh rate may be referred to as 'high-speed driving'. The refresh rate may be determined according to kinds of displayed images and the like, but is not limited thereto.

The low-speed driving may be set so as to reduce power consumption of the display device when there is no change in the input image for a predetermined period of time by analyzing the input image. The low-speed driving may reduce power consumption of the pixels by reducing the refresh rate of the pixels when a still image is input for a certain period of time or longer. The low-speed driving is not limited to be applied only to a case in which a still image is input. The display device 1 may be driven at low speed when the display device 1 operates in a stand-by mode, or when a user command or input image is not input to the display panel 50 for a predetermined time period or longer.

The timing controller 10 may generate control signals CONT1 to CONT4 so that the pixel PX can operate at various refresh rates. For example, the timing controller 10 may vary the refresh rate by changing a frequency of a clock signal included in the control signals CONT1 to CONT4 or adjusting a timing of the horizontal synchronization signal or the vertical synchronization signal, or driving the gate driver 20 in a mask manner.

Figure 2:
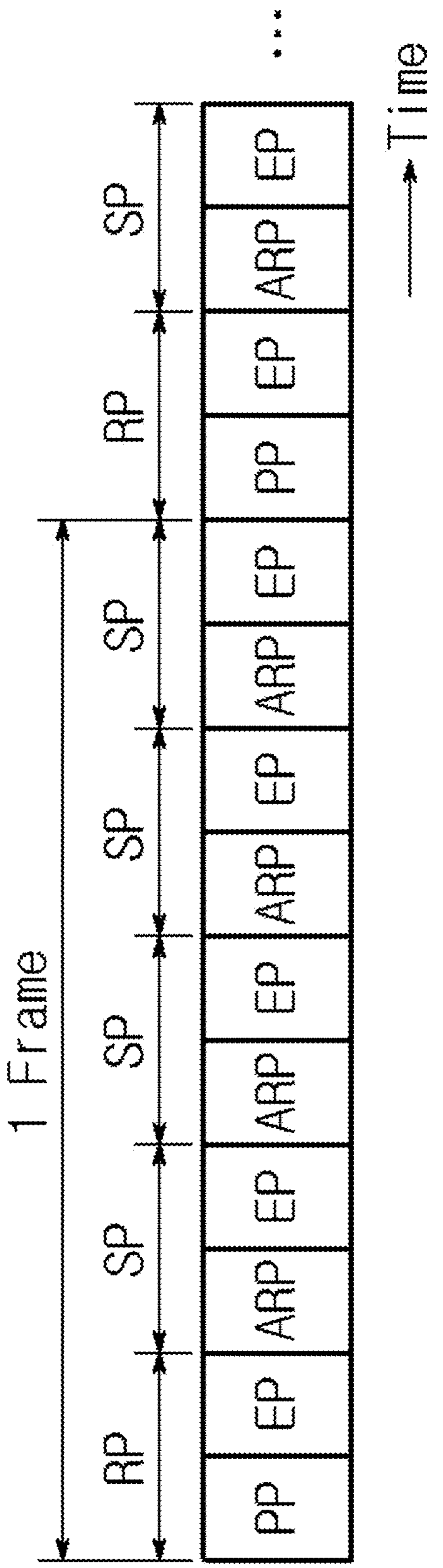
FIG. 2 is a diagram illustrating a method for operating a display device according to an embodiment.

FIG. 2 is a diagram illustrating a method for operating the display device according to an embodiment.

In the variable refresh rate mode, one frame may be configured with combination of at least one refresh period RP and at least one skip period SP. During the refresh period RP, each of the pixels PX (FIG. 1) may be programmed into a new data voltage, and the light emitting diode of the pixel PX may emit light in correspondence with the programmed data voltage. The refresh period RP may be segmented into an initialization period, a sampling period, a hold period, and the like for data voltage programming. The refresh period RP may be referred to as a refresh frame.

During the skip period SP, a procedure in which a new data voltage is applied to the pixel PX is omitted. During the skip period SP, the light emitting diode of each of the pixels PX may emit light in correspondence with the data voltage programmed during the previous refresh period RP. The skip period SP may be referred to as a hold period, a skip frame, a hold frame, and the like.

In an embodiment, in order to vary the refresh rate, a length of one frame may be varied by adjusting a quantity or a length of the skip period SP. Then, as a length of the refresh period RP is sufficiently secured, the data voltage can be stably programmed.

In such an embodiment, a generation cycle of the refresh period RP may vary according to the refresh rate which is varied. The generation cycle of the refresh period RP gets longer as the refresh rate is low, and a quantity of the skip periods SP between the refresh periods RP increases as the refresh rate is low.

For example, the generation cycle of the refresh period RP may be 1 sec/120 at 120 Hz, 1 sec/60 at 60 Hz, 1 sec/24 at 24 Hz, and 1 sec at 1 Hz. The quantity of the skip periods SP positioned between two adjacent refresh periods RP may be 0 at 12 Hz, 1 at 60 Hz, 4 at 24 Hz, and 9 at 1 Hz, and an example at 24 Hz is illustrated in FIG. 2. However, the present embodiment is not limited thereto.

The refresh period RP includes a programming period PP and a light emission period EP. During the programming period PP, a new data voltage is programmed into the pixels PX, and during the light emission period EP, the pixels PX emit light in correspondence with the programmed data voltage.

The skip period SP includes a light emission period EP, of which the light emission signal EM (FIG. 1) has a turn-on level. During the light emission period EP, the pixels PX keep the light emission luminance of the previous refresh period RP unchanged.

In an embodiment, a length of the light emission period EP of the skip period SP may be longer than a length of the light emission period EP of the refresh period RP. Therefore, when comparing an integrated quantity of the luminance during a certain period of time, as the refresh rate is low (that is, as a quantity of the skip period SP is great), the integrated quantity of luminance increases relatively more. For example, the integrated quantity of luminance for a certain period of time is greater at 60 Hz than at 120 Hz, and greater at 24 Hz than 60 Hz, and greater at 1 Hz than 24 Hz.

Due to a difference in the integrated quantity of luminance according to the refresh rate, a flicker may be visible at a time point when the refresh rate is changed. In order to solve this problem, the anode electrode of the light emitting diode included in the pixel PX (FIG. 1) may be reset to a predetermined reset voltage (for example, an initialization voltage) during the skip period SP. In such am embodiment, the skip period SP may be referred to as an anode initialization period or an anode initialization frame.

The refresh period RP includes a programming period PP and a light emission period EP. During the programming period PP, a new data voltage is programmed into the pixels PX, and during the light emission period EP, the pixels PX emit light in correspondence with the programmed data voltage.

The skip period SP includes an anode initialization period ARP in which the light emission signal EM (FIG. 1) has a turn-off level, and a light emission period EP in which the light emission signal has a turn-on level. During the anode initialization period ARP, a predetermined reset voltage (for example, an initialization voltage) is applied to the anode electrode of the light emitting diode included in the pixel PX. During this period, the light emitting diode may not emit light by the reset voltage. During the light emission period EP, the pixels PX emit light at luminance of the previous refresh period RP.

A length of the anode initialization period ARP may be identical to a length of the programming period PP so that the integrated quantities of luminance of the skip period SP and the refresh period RP become identical. As such, in an embodiment including the anode initialization period ARP, a deviation of the integrated quantity of luminance because of the refresh rate cannot occur and the flicker due to the difference of the integrated quantity of luminance can be suppressed.

Figure 3:
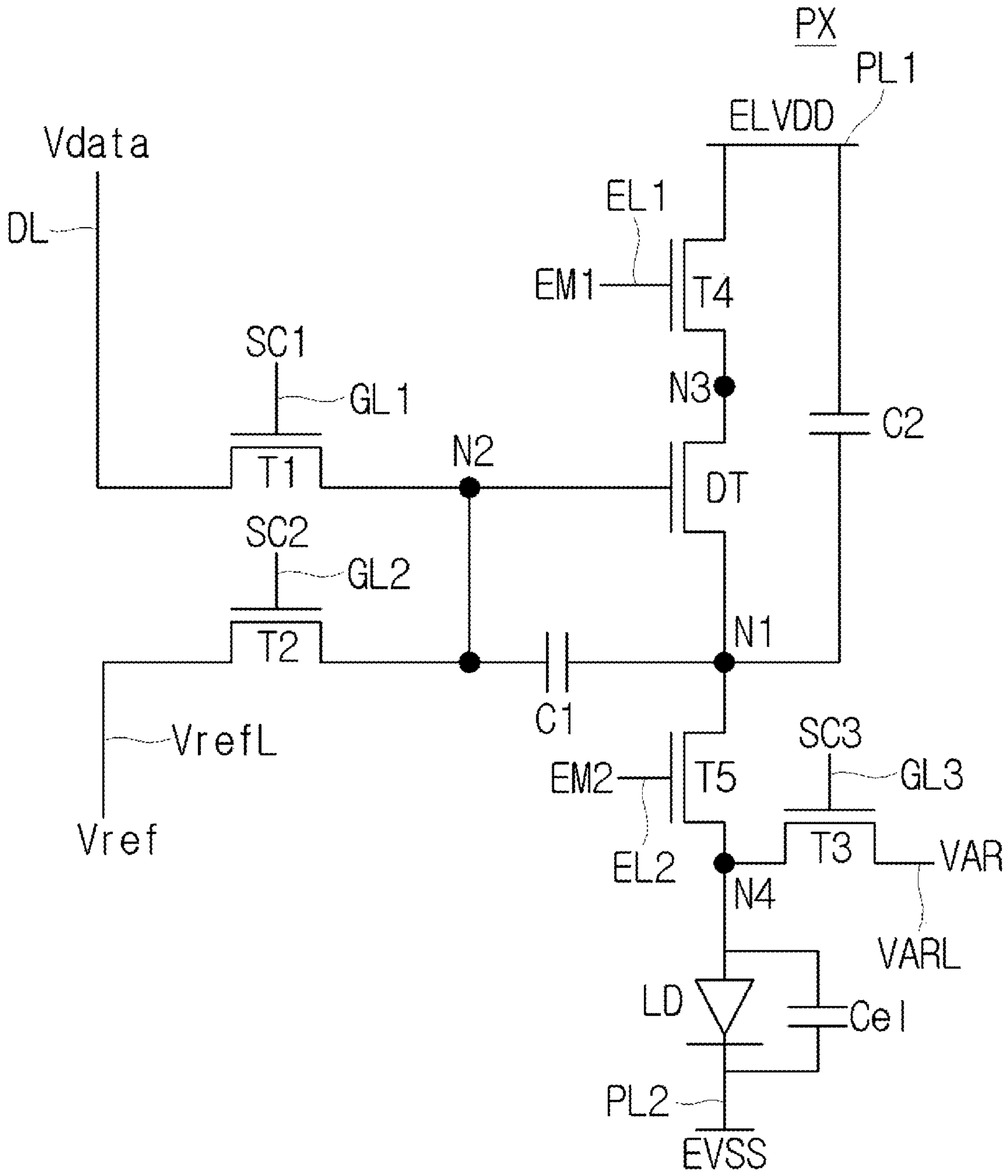
FIG. 3 is a circuit diagram of a pixel according to a first embodiment.

FIG. 3 is a circuit diagram of the pixel according to a first embodiment.

Referring to FIG. 3, the pixel PX according to an embodiment may include a driving transistor DT, a light emitting diode LD connected to the driving transistor DT, and a control circuit configured to control an amount of a driving current to be applied to the light emitting diode LD through the driving transistor DT. For example, the control circuit may include first to fifth transistors T1 to T5, and first and second capacitors C1 and C2.

A first electrode of the driving transistor DT is configured to receive a high potential driving voltage ELVDD through a third node N3 (connected to a high potential driving voltage line PL1), and a second electrode thereof is connected to a first node N1. A gate electrode of the driving transistor DT is connected to a second node N2. The driving transistor DT may be turned on according to a voltage applied to the second node N2 and may control an amount of the driving current flowing to the light emitting diode LD.

A first electrode of the first transistor T1 is connected to the data line DL, and a second electrode thereof is connected to the gate electrode of the driving transistor DT through the second node N2. A gate electrode of the first transistor T1 may be connected to the first scan line GL1 and may receive a first scan signal SC1. The first transistor T1 may be turned on according to the first scan signal SC1 applied to a first scan line GL1 and may deliver a data voltage Vdata applied to the data line DL to the second node N2. Such a first transistor T1 may be referred to as a switching transistor.

A first electrode of the second transistor T2 is configured to receive a reference voltage Vref (connected to a reference voltage line VrefL), and a second electrode thereof is connected to the second node N2. A gate electrode of the second transistor T2 may be connected to a second scan line GL2 and may receive a second scan signal SC2. The second transistor T2 may be turned on according to the second scan signal SC2 applied to the second scan line GL2 and may deliver a reference voltage Vref to the second node N2. Such a second transistor T2 may be referred to as an initialization transistor.

A first electrode of the third transistor T3 is configured to receive a bias voltage VAR (connected to a bias voltage line VARL), and a second electrode thereof is connected to the anode electrode of the light emitting diode LD through a fourth node N4. A gate electrode of the third transistor T3 may be connected to a third scan line GL3 and may receive a third scan signal SC3. The third transistor T3 may be turned on according to the third scan signal SC3 applied to the third scan line GL3, and may deliver a bias voltage VAR to the anode electrode of the light emitting diode LD. Such a third transistor T3 may be referred to as an anode initialization transistor.

A first electrode of the fourth transistor T4 is configured to receive the high potential driving voltage ELVDD (connected to the high potential driving voltage line PL1), and a second electrode thereof is connected to the driving transistor DT through the third node N3. A gate electrode of the fourth transistor T4 may be connected to a first light emission line EL1 and may receive a first light emission signal EM1. The fourth transistor T4 may connect the high potential driving voltage line PL1 and the driving transistor DT to each other in response to the first light emission signal EM1 applied to the first light emission line EL1.

A first electrode of a fifth transistor T5 may be connected to the driving transistor DT through the first node N1, and a second electrode thereof may be connected to the light emitting diode LD through the fourth node N4. A gate electrode of the fifth transistor T5 may be connected to a second light emission line EL2 and may receive a second light emission signal EM2. The fifth transistor T5 may connect the driving transistor DT and the light emitting diode LD to each other in response to the second light emission signal EM2 applied to the second light emission line EL2.

When the fourth transistor T4 and the fifth transistor T5 are turned on, a current path is formed between the high potential driving voltage ELVDD and the low potential driving voltage ELVSS, and a driving current flows to the light emitting diode LD, thereby the light emitting diode LD may emit light. Such fourth transistor T4 and the fifth transistor T5 may be referred to as light emitting transistors.

The first capacitor C1 is connected between the first node N1 and the second node N2. The first capacitor C1 may store a voltage corresponding to a voltage difference between the first node N1 and the second node N2. For example, the first capacitor C1 may store a voltage corresponding to a voltage difference between the data voltage Vdata applied to the data line DL and the second node N2, and maintain the stored voltage during one frame, thereby stabilizing a voltage of the gate electrode (that is, the second node N2) of the driving transistor DT. Such a first capacitor C1 may be referred to as a storage capacitor.

The second capacitor C2 is connected between the first node N1 and the high potential driving voltage ELVDD. The second capacitor C2 may store a voltage corresponding to a voltage difference between the first node N1 and the high potential driving voltage ELVDD. For example, the second capacitor C2 may store a voltage corresponding to a voltage difference between a threshold voltage charged in the first node N1 and the high potential driving voltage ELVDD, thereby compensating deterioration of the driving transistor DT. Such a second capacitor C2 may be referred to as a compensation capacitor.

The anode electrode of the light emitting diode LD may be connected to the fourth node N4, and the cathode electrode thereof may be connected to the low potential driving voltage ELVSS. The light emitting diode LD may further include a capacitor Cel formed between the anode electrode and the cathode electrode.

When the driving transistor DT, the fourth transistor T4, and the fifth transistor T5 are turned on, a current path is formed between the high potential driving voltage ELVDD and the low potential driving voltage ELVSS, and a driving current may flow to the light emitting diode LD. The light emitting diode LD may emit light at luminance corresponding to the driving current applied thereto.

In the embodiment illustrated in FIG. 3, the pixel PX may include an oxide semiconductor thin film transistor.

Figure 4:
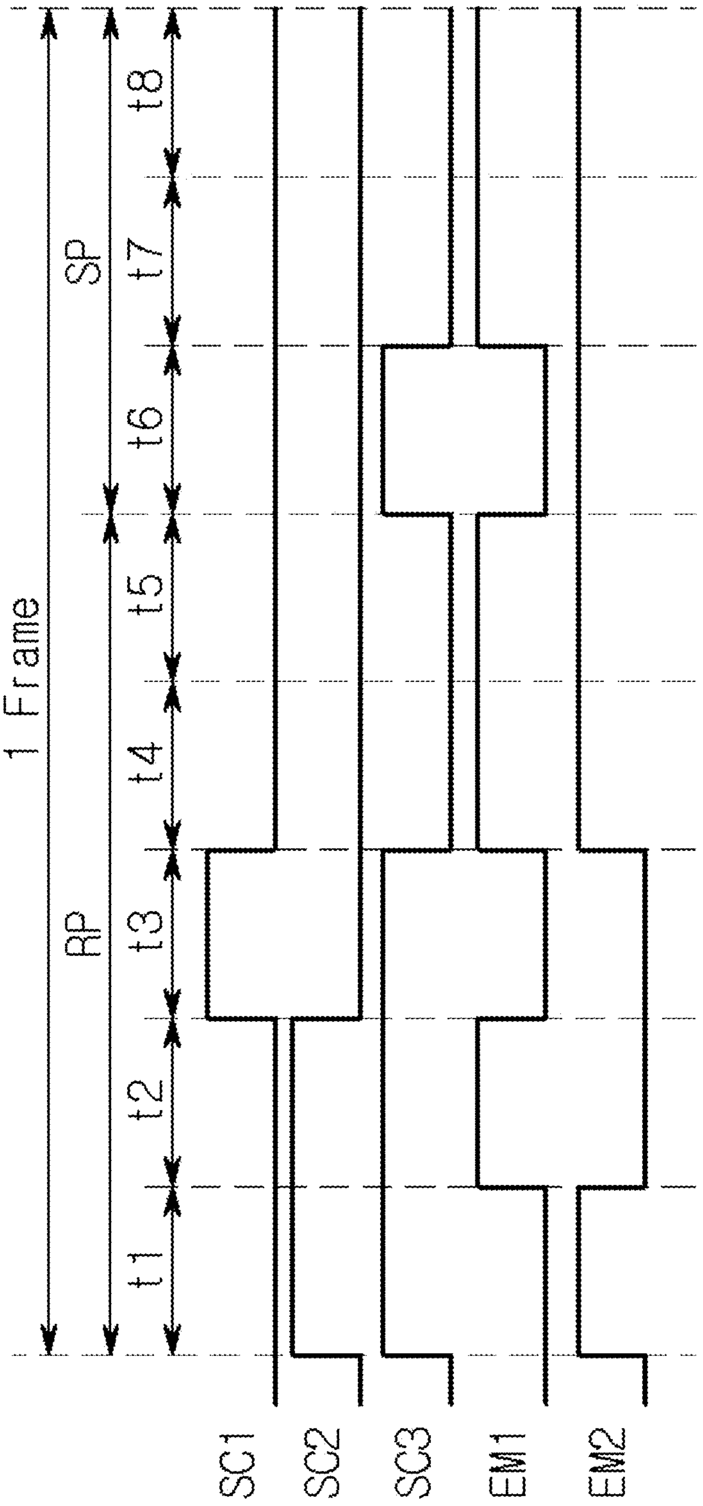
FIG. 4 is a diagram illustrating a method for operating a pixel illustrated in FIG. 3 according to an embodiment.

FIG. 4 is a diagram illustrating a method for operating the pixel illustrated in FIG. 3 according to an embodiment.

In the variable refresh rate mode, one frame may be configured with combination of at least one refresh period RP and at least one skip period SP.

The refresh period RP may include the initialization period t1, the sampling period t2, a programming period t3, a boosting period t4, and a light emission period t5. The pixel PX is initialized in the initialization period t1, and the threshold voltage Vth of the driving transistor DT is sensed in the sampling period t2 and stored in the first capacitor CL. In the programming period t3, the data voltage Vdata is applied to the second node N2, and in the light emission period t5, the light emitting diode LD may emit light at luminance corresponding to the data voltage Vdata.

In the initialization period t1, the second scan signal SC2 and the third scan signal SC3 in a turn-on level (for example, a high level) are applied, and the second transistor T2 and the third transistor T3 are turned on. In addition, in the initialization period t1, the second light emission signal EM2 in a turn-on level is applied, and the fifth transistor T5 is turned on.

When the reference voltage Vref is applied to the second node N2 through the second transistor T2 which is turned on, the gate voltage of the driving transistor DT may be initialized to the reference voltage Vref. The reference voltage Vref may be a positive voltage in a low level, and may be a voltage corresponding to black luminance, but is not limited thereto.

When the bias voltage VAR is applied to the fourth node N4 through the third transistor T3 which is turned on, the anode electrode of the light emitting diode LD may be initialized to the bias voltage VAR. The bias voltage VAR may be applied more to the first node N1 through the fifth transistor T5 which is turned on. The bias voltage VAR may be a voltage which is the same as or different from the reference voltage Vref. For example, the bias voltage VAR may be a voltage lower than the reference voltage Vref, or a negative voltage, but is not limited thereto.

In the sampling period t2, the first light emission signal EM1 may switch over to a turn-on level and the fourth transistor T4 may be turned on. In addition, the second light emission signal EM2 may switch over to a turn-off level and the fifth transistor T5 may be turned off.

When the high potential driving voltage ELVDD is applied to the third node N3 through the fourth transistor T4 which is turned on, the high potential driving voltage ELVDD may be applied to a drain electrode of the driving transistor DT. A reference voltage Vref is applied to the gate electrode of the driving transistor DT through the second transistor T2. A source electrode of the driving transistor DT gets into a voltage variable state.

Accordingly, in the sampling period t2, the driving transistor DT may be turned on and operate in a source follower manner. That is, the driving transistor DT may supply a drain-source current to the first node N1 by the time when a gate-source voltage reaches a threshold voltage Vth of the driving transistor DT. A voltage of the first node N1 may increase gradually from a bias voltage VAR and may converge to a voltage Vref-Vth corresponding to a difference between the reference voltage Vref and the threshold voltage Vth.

The first capacitor C1 stores a voltage corresponding to a difference between a voltage of the second node N2 and a voltage of the first node N1. After the driving transistor DT is saturated, the first capacitor C1 may store a threshold voltage Vth corresponding to a difference between the reference voltage Vref and the voltage Vref-Vth of the first node N1.

The second capacitor C2 stores a voltage corresponding to a difference between a voltage of the first node N1 and the high potential driving voltage ELVDD. After the driving transistor DT is saturated, the second capacitor C2 may store a voltage Vref-Vth-ELVDD corresponding to a difference between the high potential driving voltage ELVDD and the voltage Vref-Vth of the first node N1.

In the programming period t3, the second scan signal SC2 switches over to a turn-off level, and the first light emission signal EM1 switches over to a turn-off level, thereby the second transistor T2 and the fourth transistor T4 are turned off. In addition, in the programming period t3, the first scan signal SC1 is applied in a turn-on level, thereby the first transistor T1 is turned on.

When the data voltage Vdata is applied to the second node N2 through the first transistor T1 which is turned on, the data voltage Vdata may be applied to the gate electrode of the driving transistor DT. In the programming period t3, a voltage of the first node N1 may be maintained by the second capacitor C2 as a voltage Vref-Vth-ELVDD charged in the previous period.

The first capacitor C1 stores a voltage corresponding to a difference between the second node N2 and the first node N1. That is, in the programming period t3, the first capacitor C1 may store a voltage Vdata−Vref+Vth+ELVDD corresponding to a difference between the data voltage Vdata and a voltage Vref-Vth-ELVDD of the first node N1.

In the boosting period t4, the first to third scan signals SC1 to SC3 switch over to a turn-off level, and the first, second, and third transistors T1, T2, and T3 are turned off. In addition, in the boosting period t4, the first light emission signal EM1 and the second light emission signal EM2 in a turn-on level are applied, and the fourth and fifth transistors T4 and T5 are turned on.

A current path, which starts from the high potential driving voltage ELVDD, passes through the driving transistor DT, and reaches the light emitting diode LD, is formed through the fourth and fifth transistors T4 and T5 which are turned on. As a result, in the boosting period t4, voltages of the first node N1 and the second node N2 rise to a turn-on voltage of the light emitting diode LD, and the capacitor Cel of the light emitting diode LD may be charged.

In the light emission period t5, the light emitting diode LD which is turned on may emit light at luminance corresponding to a programmed voltage. Here, the voltage programmed into the driving transistor DT is a voltage programmed into the first capacitor C1, and is a voltage compensated for the data voltage Vdata by as much as a threshold voltage Vth. Therefore, deterioration of the driving transistor DT can be compensated.

The skip period SP may include an anode initialization period t6, a boosting period t7, and a light emission period t8.

In the anode initialization period t6, the first light emission signal EM1 switches over to a turn-off level and the fourth transistor T4 may be turned off, and the third scan signal SC3 switches over to a turn-on level, and the third transistor T3 may be turned on. When the bias voltage VAR is applied to the fourth node N4 through the third transistor T3 which is turned on, the anode electrode of the light emitting diode LD may be initialized to the bias voltage VAR.

In the anode initialization period t6, the light emitting diode LD does not emit light by the bias voltage VAR applied to the anode electrode of the light emitting diode LD. Instead, by the first capacitor C1 and the second capacitor C2, a voltage of the gate electrode of the driving transistor DT may be maintained as a voltage programmed in the previous refresh period RP.

Meanwhile, in the anode initialization period t6, as the bias voltage VAR is directly applied to anode electrode of the light emitting diode LD, a voltage of the anode electrode may be discharged at a relatively fast velocity, and a discharge delay of the light emitting diode LD may be improved. Through such anode initialization, deviation of the integrated quantity of luminance due to the refresh rate does not occur, and the flicker due to a difference in the integrated quantity of luminance can be suppressed.

In the boosting period t7, the third scan signal SC3 switches over to a turn-off level, the first light emission signal EM1 switches over to a turn-on level, the third transistor T3 may be turned off, and the fourth transistor T4 may be turned on.

A current path, which starts from the high potential driving voltage ELVDD, passes through the driving transistor DT, and reaches the light emitting diode LD, is formed through the fourth and fifth transistors T4 and T5 which are turned on. As a result, in the boosting period t7, voltages of the first node N1 and the second node N2 rise to a turn-on voltage of the light emitting diode LD, and the capacitor Cel of the light emitting diode LD may be charged.

During the light emission period t8, the light emitting diode LD may emit light at luminance in correspondence with the voltage programmed during the previous refresh period SP.

Figure 5:
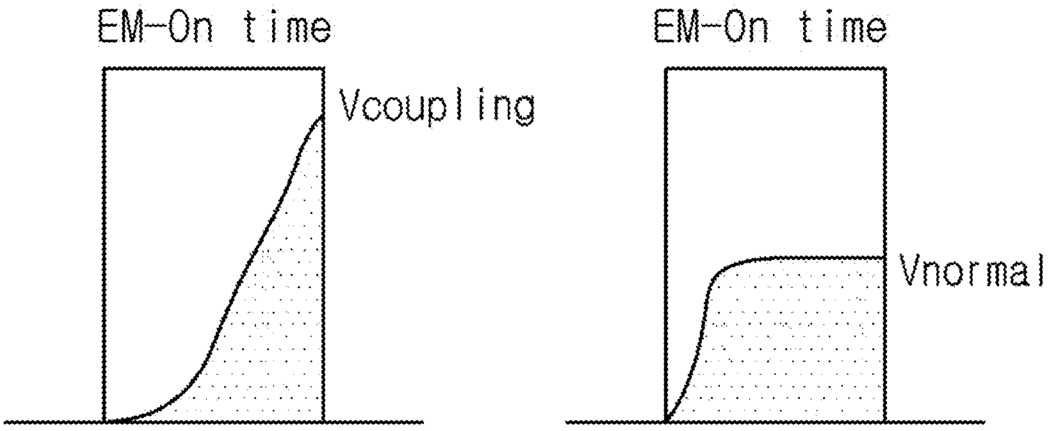
FIG. 5 is a view illustrating a voltage change of a light emitting node in a boosting time according to an embodiment.

FIG. 5 is a view illustrating a voltage change of a light emitting node in a boosting time.

Referring to FIGS. 3 and 5 together, in FIG. 5, 'Vnormal' is an ideal voltage of the anode electrode of the light emitting diode LD which is not influenced by the voltage coupling, and 'Vcoupling' is a voltage of the anode electrode of the light emitting diode LD which is influenced and changed by the voltage coupling.

During the turn-on time (an EM-On time, for example, the boosting period t4 and t7, and the light emission period t5 and t8) of the light emission signal in FIG. 4, a driving current is applied to the light emitting diode LD in correspondence with a voltage stored in the first and second capacitors C1 and C2, and a voltage of the anode electrode of the light emitting diode LD gradually rises.

In an ideal case, as what is expressed with the 'Vnormal' in FIG. 5, in the turn-on time (the EM-On time) of the light emission signal, the voltage of the anode electrode reaches the turn-on level of the light emitting diode LD, and as the driving current is discharged to the low potential driving voltage line PL2 through the light emitting diode LD which is turned on thereafter, the voltage of the anode electrode is stably maintained.

However, in an actual operation environment, the voltage of the anode electrode is influenced by the voltage coupling between the anode electrode and the capacitors C1 and C2. In more detail, in the turn-on time (the EM-On time) of the light emission signal, a voltage of the first node N1 may be sharply changed when the fifth transistor T5 is turned on. When the second capacitor C2 having a great electric capacity is electrically connected to the corresponding node, the voltage coupling may be generated between the first node N1 and the second capacitor C2. This interrupts a voltage change of the first node N1, and as expressed with 'Vcoupling', a delay may occur until turn-on of the light emitting diode LD and/or until the light emitting diode LD emits light at the corresponding luminance. In addition, when the voltage of the first node N1 is changed by the voltage coupling, distortion occurs to a voltage of the second node N2 which is indirectly connected to the first node N1, and the source-gate voltage of the driving transistor DT cannot be stably maintained. Moreover, when the display device 1 (FIG. 1) operates at a high temperature, the current sensitivity, in particular, in the low grayscale increases, thereby the image quality deterioration is caused.

In case of the first capacitor C1, it is difficult to reduce an area thereof so as to minimize the boosting loss, and also, it is difficult to reduce an area of the light emitting diode LD to a predetermined size or less in consideration of the life-span and efficiency. Therefore, in order to minimize or at least reduce the influence by the voltage coupling, a method for distributing electric charges charged to the second capacitor C2 while reducing the area of the second capacitor C2, and separating the electric charges distributed in the boosting period t3 and t7 from the anode electrode of the light emitting diode LD is required.

Figure 6:
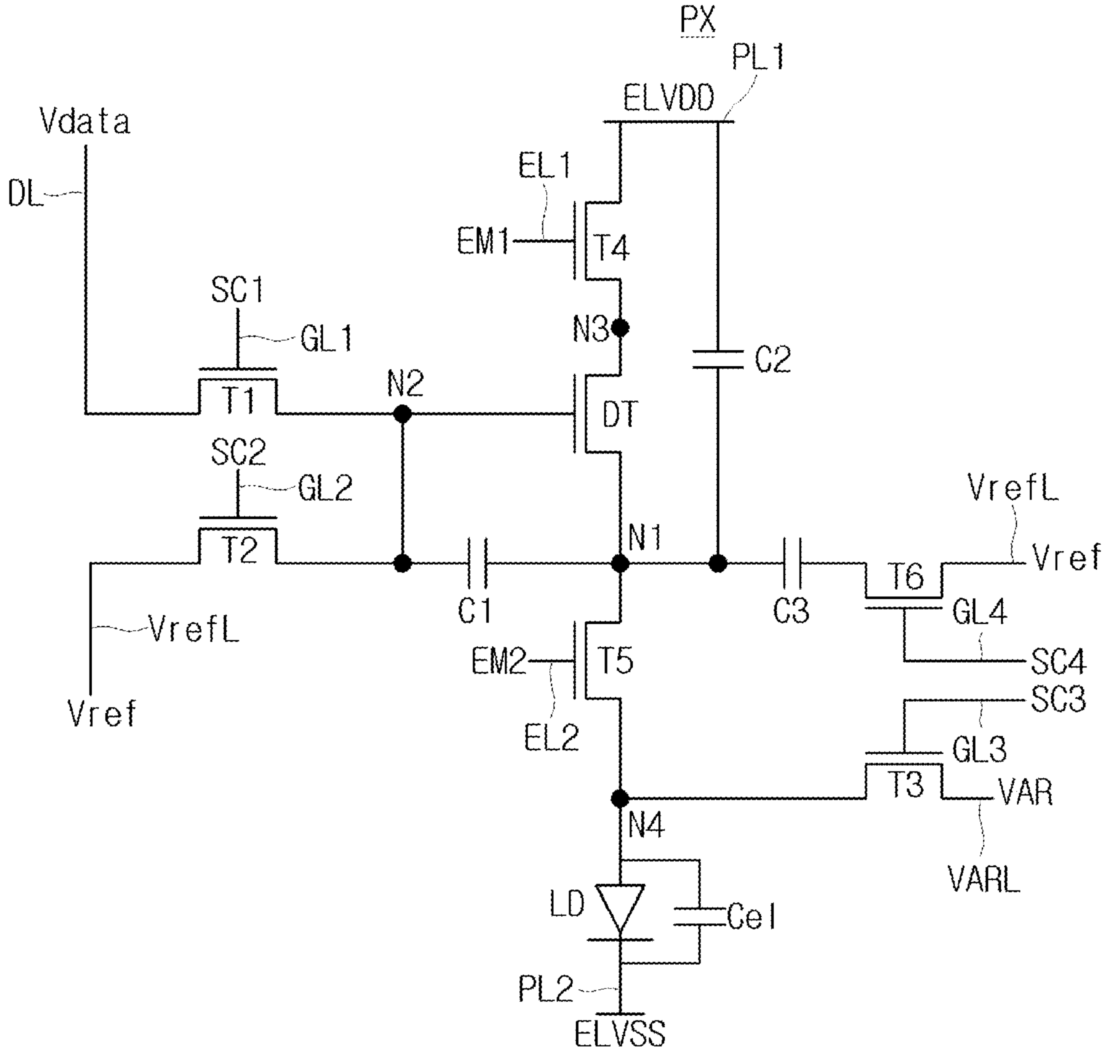
FIG. 6 is a circuit diagram of a pixel according to a second embodiment.

FIG. 6 is a circuit diagram of a pixel according to a second embodiment.

Referring to FIG. 6, the pixel PX according to another embodiment may include a driving transistor DT, a light emitting diode LD connected to the driving transistor DT, and a control circuit configured to control an amount of a driving current to be applied to the light emitting diode LD through the driving transistor DT. For example, the control circuit may include first to sixth transistors T1 to T6, and first to third capacitors C1, C2, and C3.

A first electrode of the driving transistor DT is configured to receive a high potential driving voltage ELVDD through a third node N3 (connected to a high potential driving voltage line PL1), and a second electrode thereof is connected to a first node N1. A gate electrode of the driving transistor DT is connected to a second node N2. The driving transistor DT may be turned on according to a voltage applied to the second node N2 and may control an amount of the driving current flowing to the light emitting diode LD.

The first electrode of the first transistor T1 is connected to the data line DL, and the second electrode thereof is connected to the gate electrode of the driving transistor DT through the second node N2. A gate electrode of a first transistor T1 may be connected to the first scan line GL1 and may receive a first scan signal SC1. The first transistor T1 may be turned on according to the first scan signal SC1 applied to a first scan line GL1 and may deliver a data voltage Vdata applied to the data line DL to the second node N2. Such a first transistor T1 may be referred to as a switching transistor.

A first electrode of the second transistor T2 is configured to receive a reference voltage Vref (connected to the reference voltage line VrefL), and a second electrode thereof is connected to the second node N2. A gate electrode of the second transistor T2 may be connected to a second scan line GL2 and may receive a second scan signal SC2. The second transistor T2 may be turned on according to the second scan signal SC2 applied to the second scan line GL2 and may deliver a reference voltage Vref to the second node N2. Such a second transistor T2 may be referred to as an initialization transistor.

A first electrode of the third transistor T3 is configured to receive a bias voltage VAR (connected to a bias voltage line VARL), and a second electrode thereof is connected to the anode electrode of the light emitting diode LD through a fourth node N4. A gate electrode of the third transistor T3 may be connected to a third scan line GL3 and may receive a third scan signal SC3. The third transistor T3 may be turned on according to the third scan signal SC3 applied to the third scan line GL3, and may deliver a bias voltage VAR to the anode electrode of the light emitting diode LD. Such a third transistor T3 may be referred to as an anode initialization transistor.

A first electrode of the fourth transistor T4 is configured to receive the high potential driving voltage ELVDD (connected to the high potential driving voltage line PL1), and a second electrode thereof is connected to the driving transistor DT through the third node N3. A gate electrode of the fourth transistor T4 may be connected to a first light emission line EL1 and may receive a first light emission signal EM1. The fourth transistor T4 may connect the high potential driving voltage line PL1 and the driving transistor DT to each other in response to the first light emission signal EM1 applied to the first light emission line EL1.

A first electrode of a fifth transistor T5 may be connected to the driving transistor DT through the first node N1, and a second electrode thereof may be connected to the light emitting diode LD through the fourth node N4. A gate electrode of the fifth transistor T5 may be connected to a second light emission line EL2 and may receive a second light emission signal EM2. The fifth transistor T5 may connect the driving transistor DT and the light emitting diode LD to each other in response to the second light emission signal EM2 applied to the second light emission line EL2.

When the fourth transistor T4 and the fifth transistor T5 are turned on, a current path is formed between the high potential driving voltage ELVDD and the low potential driving voltage ELVSS, and a driving current flows to the light emitting diode LD, thereby the light emitting diode LD may emit light. Such fourth transistor T4 and the fifth transistor T5 may be referred to as light emitting transistors.

The first capacitor C1 is connected between the first node N1 and the second node N2. The first capacitor C1 may store a voltage corresponding to a voltage difference between the first node N1 and the second node N2. For example, the first capacitor C1 may store a voltage corresponding to a voltage difference between the data voltage Vdata applied to the data line DL and the second node N2, and maintain the stored voltage during one frame, thereby stabilizing a voltage of the gate electrode (that is, the second node N2) of the driving transistor DT. Such a first capacitor C1 may be referred to as a storage capacitor.

The second capacitor C2 is connected between the first node N1 and the high potential driving voltage ELVDD. The second capacitor C2 may store a voltage corresponding to a voltage difference between the first node N1 and the high potential driving voltage ELVDD. For example, the second capacitor C2 may store a voltage corresponding to a voltage difference between a threshold voltage charged in the first node N1 and the high potential driving voltage ELVDD, thereby compensating deterioration of the driving transistor DT. Such a second capacitor C2 may be referred to as a first compensation capacitor.

The third capacitor C3 is connected between the first node N1 and the reference voltage line VrefL. The sixth transistor T6 is connected between the third capacitor C3 and the reference voltage line VrefL. A gate electrode of the sixth transistor T6 may be connected to a fourth scan line GL4 and may receive a fourth scan signal SC4. The sixth transistor T6 may be turned on according to the fourth scan signal SC4 applied to the fourth scan line GL4 and may deliver a reference voltage Vref to the second capacitor C2.

When the sixth transistor T6 is turned on, the third capacitor C3 may store a voltage corresponding to a voltage difference between the first node N1 and the reference voltage Vref. In an embodiment, the third capacitor C3 may compensate for a driving characteristic of the driving transistor DT by storing a voltage value of the threshold voltage Vth of the driving transistor DT. For example, the third capacitor C3 may store a voltage corresponding to the threshold voltage Vth of the driving transistor DT during a non-emission period in which the light emitting diode which will be described below does not emit light (for example, during the initialization, sampling, and programming periods). In addition, the third capacitor C3 may not have a relationship with a voltage variation of the nodes connected to the driving transistor DT, in particular, the first node N1, because one end thereof is floated due to turning off of the sixth transistor T6 during when the light emitting diode LD is boosted or during the light emission period (for example, the boosting and light emission periods) in which the light emitting diode LD emits light. Such a third capacitor C3 may be referred to as a second compensation capacitor, and the sixth transistor T6 may be referred to as a compensation transistor.

In an embodiment, the capacitances of the second capacitor C2 and the third capacitor C3 may be smaller than the capacitance of the first capacitor CL. That is, sizes (areas, that is, areas occupied by the electrodes) of the second capacitor C2 and the third capacitor C3 may be smaller than a size of the first capacitor CL. If the size of the capacitor is small, the influence of the voltage coupling between the capacitor and other adjacent circuit elements, for example, the driving transistor DT and/or the light emitting diode LD may be reduced.

In comparison with the embodiment in FIG. 3, the threshold voltage Vth of the driving transistor DT may be stored and compensated through the second capacitor C2 and the third capacitor C3. The threshold voltage Vth is stored in a distributed manner in two capacitors, and the size of the second capacitor C2 may be formed smaller than a size of the embodiment in FIG. 3. In addition, while the voltage of the anode electrode of the light emitting diode LD is boosted, one electrode of the third capacitor C3 is floated through turning off of the sixth transistor T6, thereby the one electrode thereof can be substantially separated from the first node N1. That is, while the voltage of the anode electrode is boosted, the third capacitor C3 has no relationship with the voltage variation of the first node N1.

As a result, the pixel PX in FIG. 6 separates at least one capacitor C3 among the capacitors C2 and C3 from the driving transistor DT during the boosting period, while sufficiently compensating for a characteristic voltage of the driving transistor DT through two capacitors C2 and C3 having small areas, and thus, the pixel PX in FIG. 6 may minimize or remove the voltage coupling in the driving transistor DT and the light emitting diode LD caused due to the capacitor during the boosting period.

The light emitting diode LD may have the anode electrode connected to the fourth node N4, and the cathode electrode connected to the low potential driving voltage ELVSS. The light emitting diode LD may further include a capacitor Cel formed between the anode electrode and the cathode electrode.

When the driving transistor DT, the fourth transistor T4, and the fifth transistor T5 are turned on, a current path is formed between the high potential driving voltage ELVDD and the low potential driving voltage ELVSS, and a driving current may flow to the light emitting diode LD. The light emitting diode LD may emit light at luminance corresponding to the driving current applied thereto.

In the embodiment illustrated in FIG. 6, the pixel PX may include an oxide semiconductor thin film transistor. The oxide semiconductor thin film transistor includes a gate electrode, a source electrode, and a drain electrode. The oxide semiconductor thin film transistor has an active layer formed of an oxide semiconductor. Here, the oxide semiconductor may be set as an amorphous oxide semiconductor or a crystalline oxide semiconductor. The oxide semiconductor thin film transistor may be configured as an n-type transistor. The oxide semiconductor thin film transistor may be formed through a low temperature process and has a lower charge mobility than that of the low temperature poly-silicon (LTPS) thin film transistor. Such an oxide semiconductor thin film transistor has an excellent off current characteristic.

However, the present embodiment is not limited thereto. In various other embodiments, the pixel PX as a whole may be configured as an oxide semiconductor thin film transistor or may be configured as a hybrid type including both the LTPS thin film transistor and an oxide semiconductor thin film transistor.

The LTPS thin film transistor includes a gate electrode, a source electrode, and a drain electrode. The LTPS thin film transistor has an active layer formed of poly silicon. Such an LTPS thin film transistor may be configured as a P-type thin film transistor. The LTPS thin film transistor has a high electron mobility, and therefore, has a fast driving characteristic.

Figure 7:
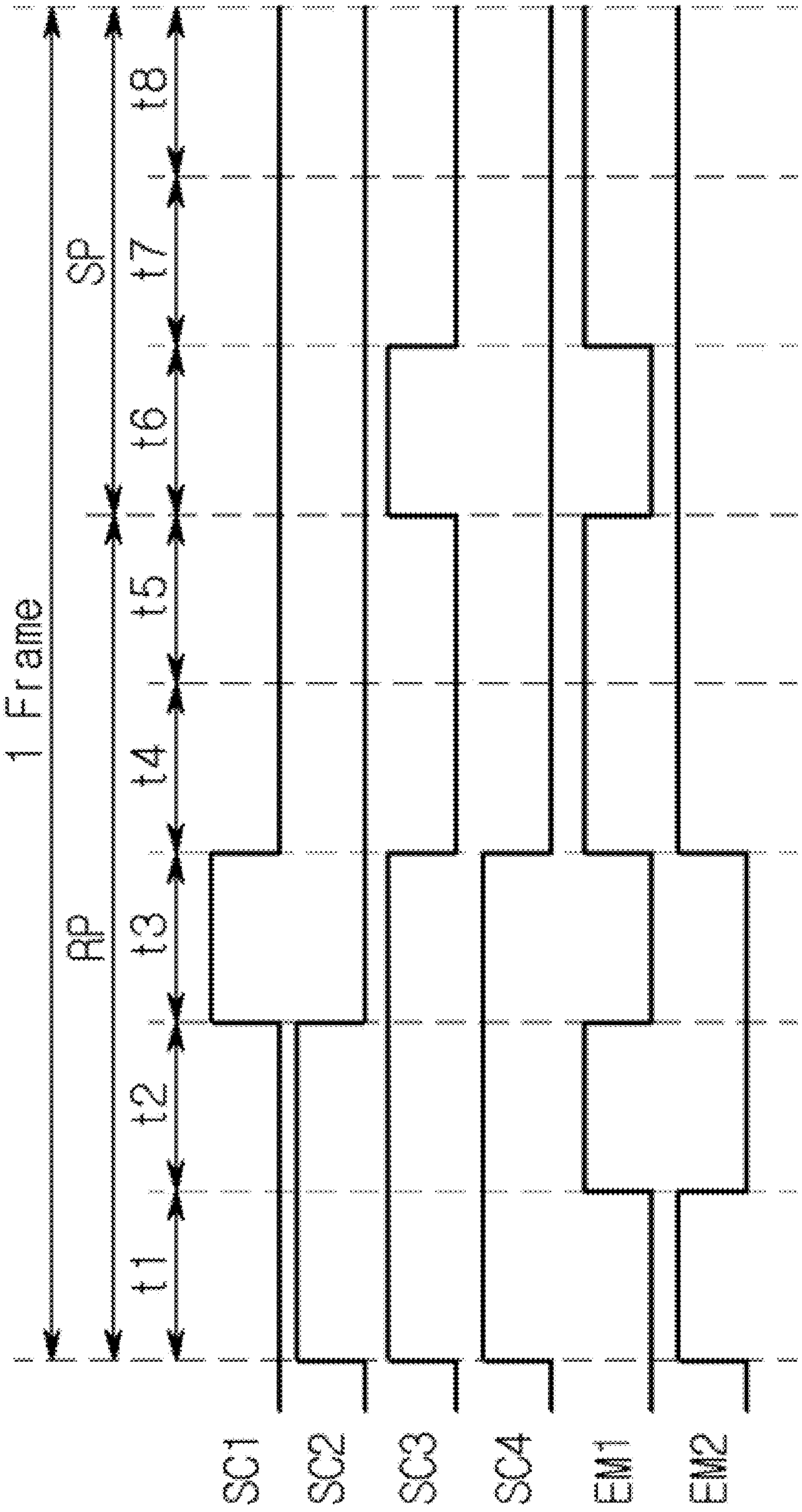
FIG. 7 is a diagram illustrating a method for operating a pixel illustrated in FIG. 6 according to an embodiment.

FIG. 7 is a diagram illustrating a method for operating the pixel illustrated in FIG. 6 according to an embodiment and FIGS. 8 to 12 are diagrams illustrating a method for operating a pixel step by step according to an embodiment.

Figure 8:
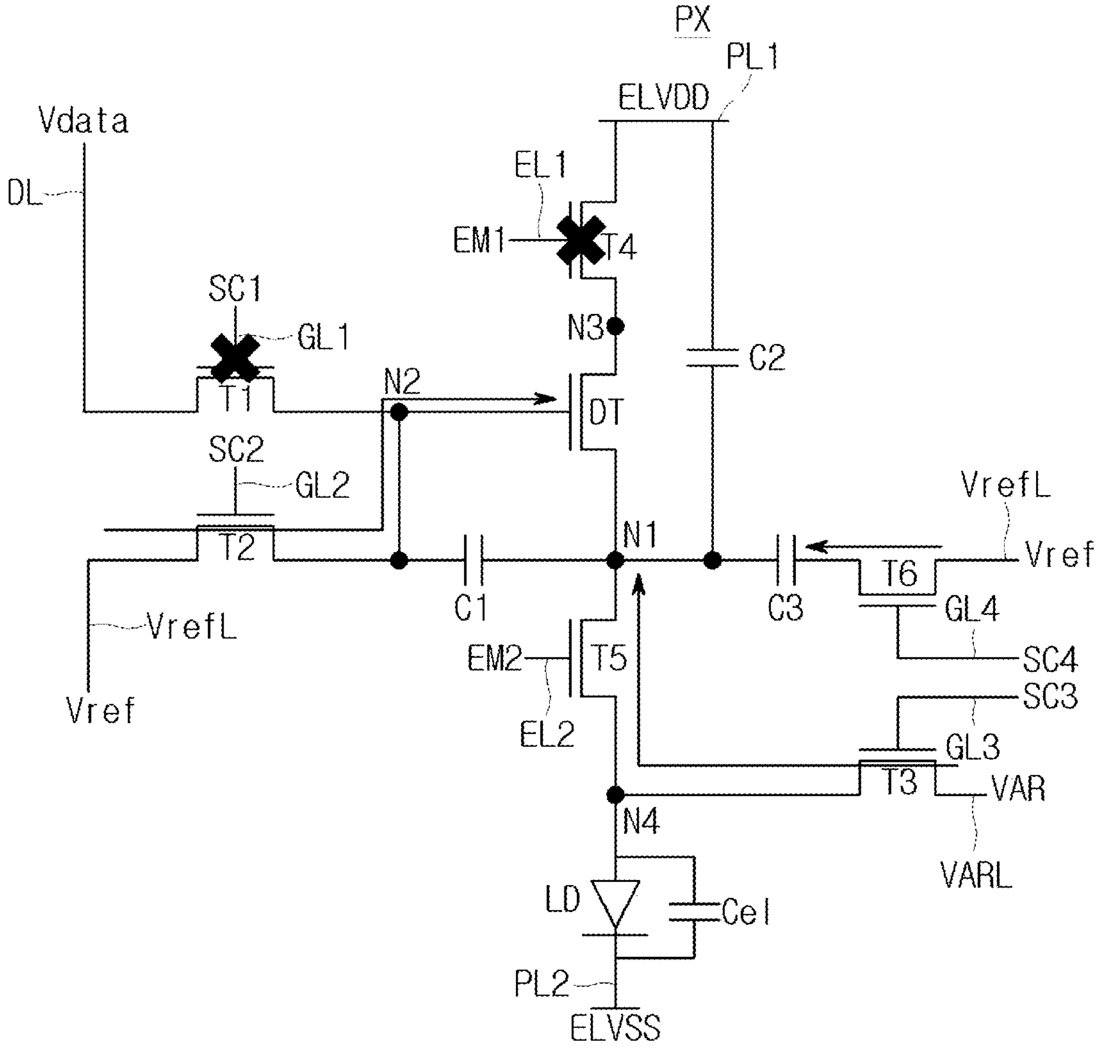
FIGS. 8 to 12 are diagrams illustrating a method for operating a pixel step by step according to an embodiment.

Referring to FIG. 8, in the variable refresh rate mode, one frame may be configured with combination of at least one refresh period RP and at least one skip period SP.

The refresh period RP may include the initialization period t1, the sampling period t2, the programming period t3, the boosting period t4, and the light emission period t5. The pixel PX is initialized in the initialization period t1, and the threshold voltage Vth of the driving transistor DT is sensed in the sampling period t2 and stored in the first capacitor CL. In the programming period t3, the data voltage Vdata is applied to the second node N2, and in the light emission period t5, the light emitting diode LD may emit light at luminance corresponding to the data voltage Vdata.

Referring to FIGS. 7 and 8 together, in the initialization period t1, the second scan signal SC2 and the third scan signal SC3 in a turn-on level (for example, a high level) are applied, and the second transistor T2 and the third transistor T3 are turned on. In addition, in the initialization period t1, the second light emission signal EM2 in a turn-on level is applied, and the fifth transistor T5 is turned on. Moreover, in the initialization period t1, the fourth scan signal SC4 in a turn-on level is further applied, and the sixth transistor T6 is turned on.

When the reference voltage Vref is applied to the second node N2 through the second transistor T2 which is turned on, the gate voltage of the driving transistor DT may be initialized to the reference voltage Vref. The reference voltage Vref may be a positive voltage in a low level, and may be a voltage corresponding to black luminance, but is not limited thereto.

When the bias voltage VAR is applied to the fourth node N4 through the third transistor T3 which is turned on, the anode electrode of the light emitting diode LD may be initialized to the bias voltage VAR. The bias voltage VAR may be applied more to the first node N1 through the fifth transistor T5 which is turned on. The bias voltage VAR may be a voltage which is the same as or different from the reference voltage Vref. For example, the bias voltage VAR may be a voltage lower than the reference voltage Vref, or a negative voltage, but is not limited thereto.

Figure 9:
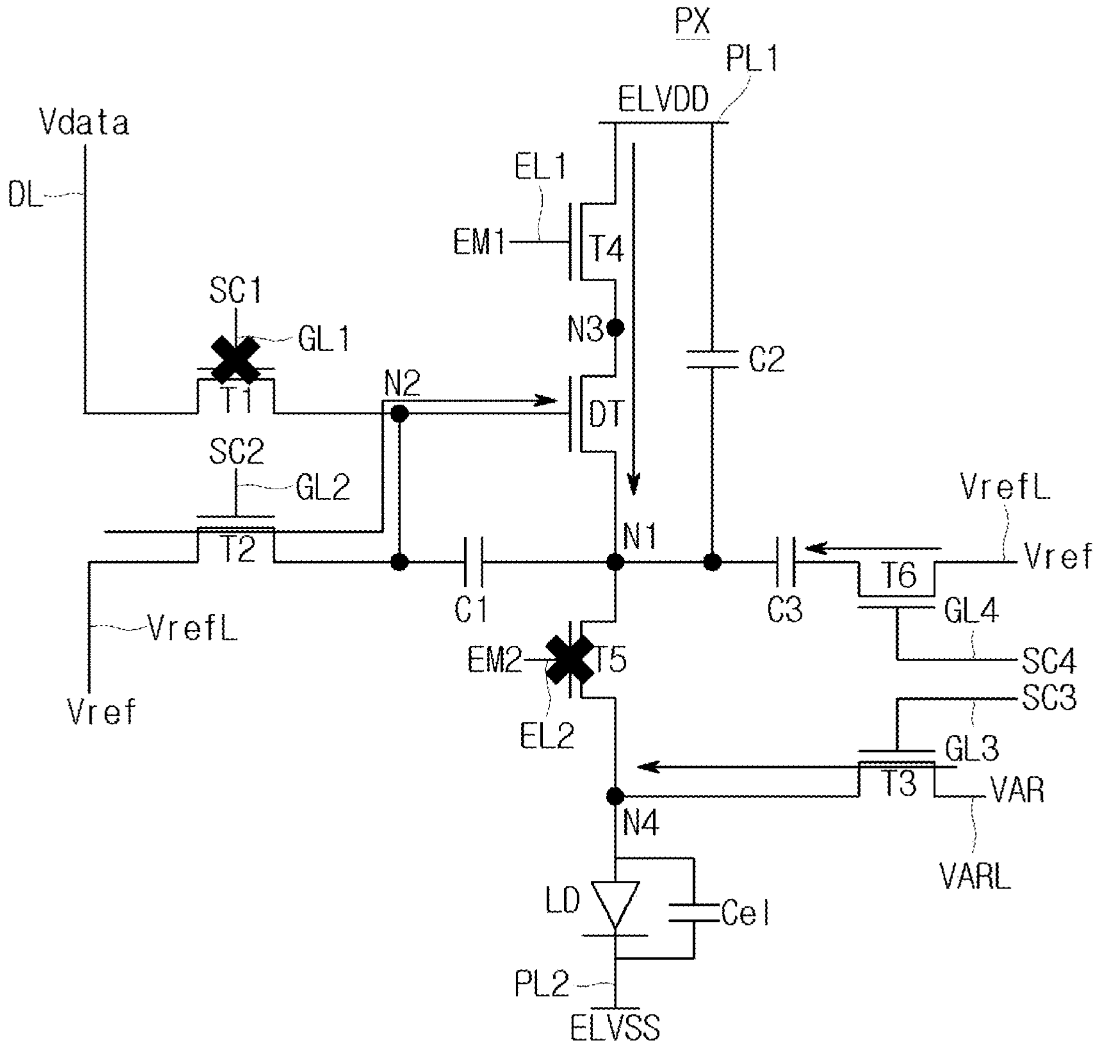

Referring to FIGS. 7 and 9 together, in the sampling period t2, the first light emission signal EM1 may switch over to a turn-on level and the fourth transistor T4 can be turned on. In addition, the second light emission signal EM2 may switch over to a turn-off level and the fifth transistor T5 can be turned off.

When the high potential driving voltage ELVDD is applied to the third node N3 through the fourth transistor T4 which is turned on, the high potential driving voltage ELVDD may be applied to a drain electrode of the driving transistor DT. A reference voltage Vref is applied to the gate electrode of the driving transistor DT through the second transistor T2. A source electrode of the driving transistor DT gets into a voltage variable state.

Accordingly, in the sampling period t2, the driving transistor DT may be turned on and operate in a source follower manner. That is, the driving transistor DT may supply a drain-source current to the first node N1 by the time when a gate-source voltage reaches a threshold voltage Vth of the driving transistor DT. A voltage of the first node N1 may increase gradually from a bias voltage VAR and may converge to a voltage Vref-Vth corresponding to a difference between the reference voltage Vref and the threshold voltage Vth.

The first capacitor C1 stores a voltage corresponding to a difference between a voltage of the second node N2 and a voltage of the first node N1. After the driving transistor DT is saturated, the first capacitor C1 may store a threshold voltage Vth corresponding to a difference between the reference voltage Vref and the voltage Vref-Vth of the first node N1.

The second capacitor C2 stores a voltage corresponding to a difference between a voltage of the first node N1 and the high potential driving voltage ELVDD. After the driving transistor DT is saturated, the second capacitor C2 may store a voltage Vref-Vth-ELVDD corresponding to a difference between the high potential driving voltage ELVDD and the voltage Vref-Vth of the first node N1.

The third capacitor C3 receives the reference voltage Vref through the sixth transistor T6 which is turned on and stores a voltage corresponding to a difference between the reference voltage Vref and a voltage of the first node N1. After the driving transistor DT is saturated, the third capacitor C3 may store a threshold voltage Vth corresponding to a difference between the reference voltage Vref and the voltage Vref-Vth of the first node N1.

Figure 10:
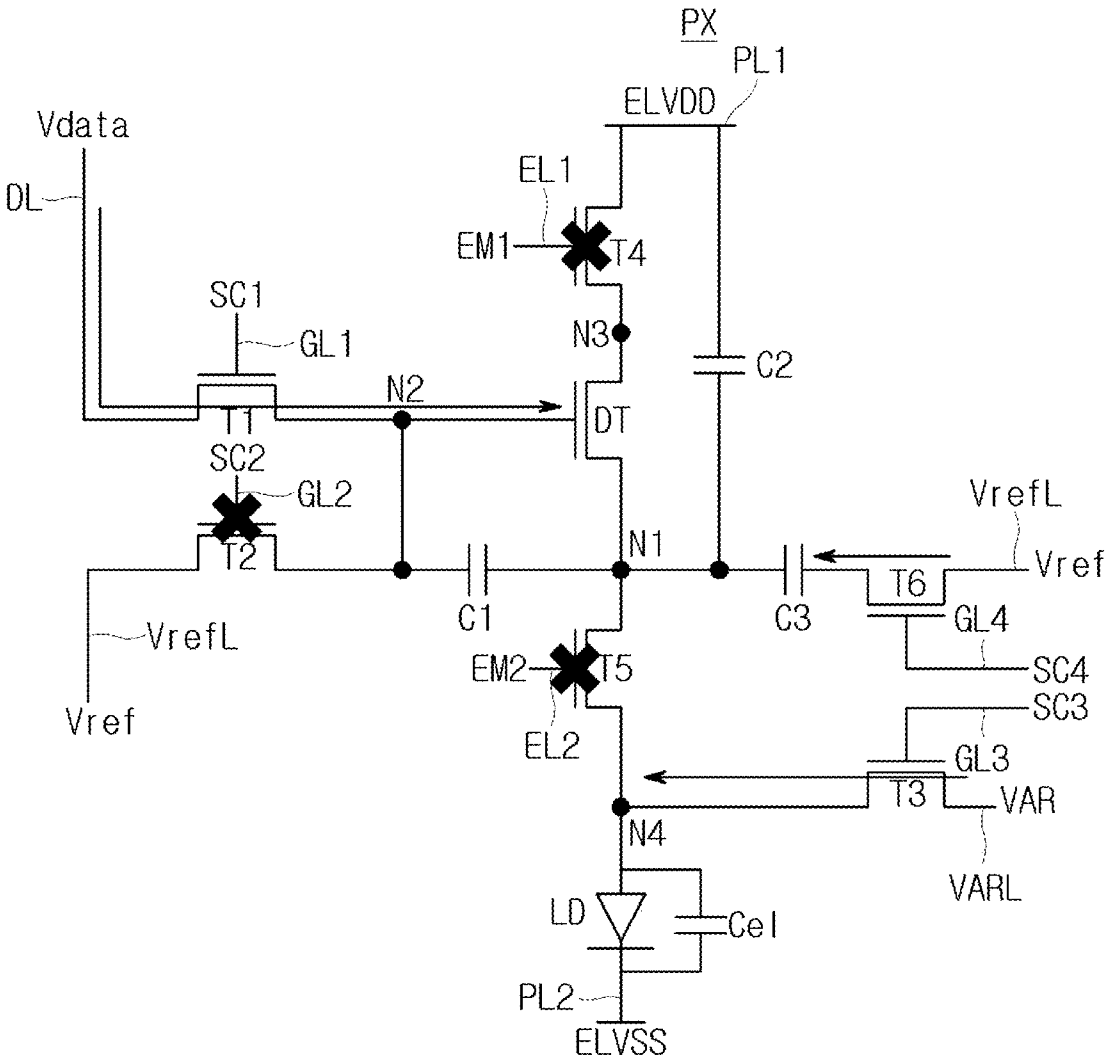

Referring to FIGS. 7 and 10 together, in the programming period t3, the second scan signal SC2 switches over to a turn-off level, and the first light emission signal EM1 switches over to a turn-off level, thereby the second transistor T2 and the fourth transistor T4 are turned off. In addition, in the programming period t3, the first scan signal SC1 is applied in a turn-on level, thereby the first transistor T1 is turned on.

When the data voltage Vdata is applied to the second node N2 through the first transistor T1 which is turned on, the data voltage Vdata may be applied to the gate electrode of the driving transistor DT. In the programming period t3, a voltage of the first node N1 charged in the previous period may be stored in the second capacitor C2 and the third capacitor C3 in a distributed manner. In the programming period t3, a voltage of the first node N1 may be maintained by the second capacitor C2 and the third capacitor C3 as a voltage charged in the previous period and including a component of the threshold voltage Vth.

The first capacitor C1 stores a voltage corresponding to a difference between the second node N2 and the first node N1. That is, in the programming period t3, the first capacitor C1 may store a voltage corresponding to a difference between the data voltage Vdata and a voltage of the first node N1.

Figure 11:
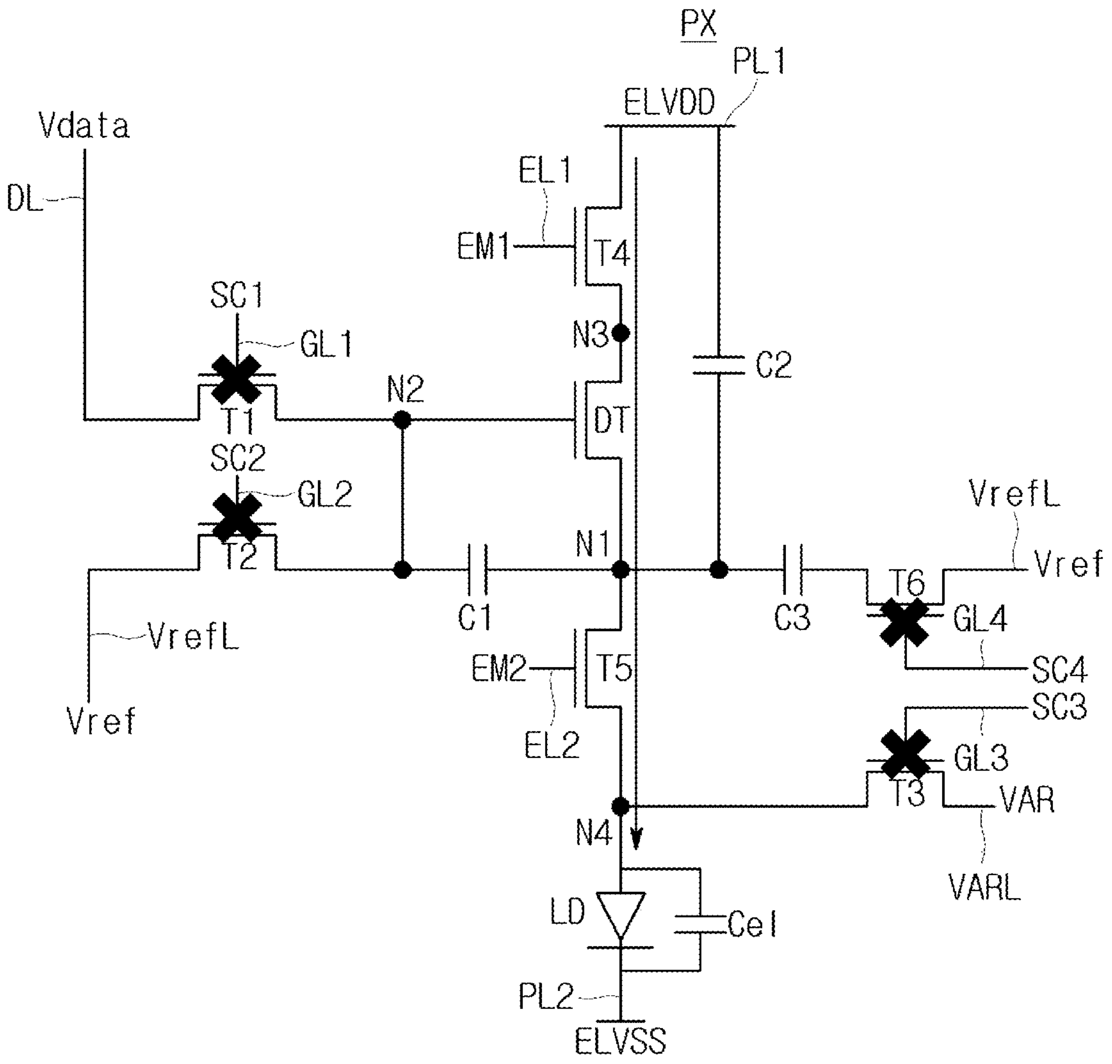

Referring to FIGS. 7 and 11 together, in the boosting period t4, the first to third scan signals SC1 to SC3 switch over to a turn-off level, and the first, second, and third transistors T1, T2, and T3 are turned off. In addition, in the boosting period t4, the first light emission signal EM1 and the second light emission signal EM2 in a turn-on level are applied, and the fourth and fifth transistors T4 and T5 are turned on.

A current path, which starts from the high potential driving voltage ELVDD, passes through the driving transistor DT, and reaches the light emitting diode LD, is formed through the fourth and fifth transistors T4 and T5 which are turned on. As a result, in the boosting period t4, voltages of the first node N1 and the second node N2 rise to a turn-on voltage of the light emitting diode LD, and the capacitor Cel of the light emitting diode LD may be charged.

Meanwhile, in the boosting period t4, the fourth scan signal SC4 switches over to a turn-off level, and the sixth transistor T6 is turned off. Then, one end of the third capacitor C3 is floated. Accordingly, the third capacitor C3 holds the threshold voltage Vth in the sampling and programming periods t2 and t3 and does not have a relationship with a voltage variation of the first node N1 and the fourth node N4 in the boosting period t4 thereafter. That is, in the boosting period t4, the voltage coupling between the third capacitor C3 and the first node N1 does not occur.

In the boosting period t4, the voltage coupling between the second capacitor C2 and the first node N1 may occur. However, the influence of the voltage coupling generated between the first node N1 and the second capacitor C2 having a small size is insignificantly small. Therefore, in the boosting period t4 and the light emission period t5 thereafter, a delay in the light emission, luminance distortion or display quality deterioration because of the voltage coupling can be prevented.

In the light emission period t5, the light emitting diode LD which is turned on may emit light at luminance corresponding to a programmed voltage. Here, the voltage programmed into the driving transistor DT is a voltage programmed into the first capacitor C1, and is a voltage compensated for the data voltage Vdata by as much as a threshold voltage Vth. Therefore, deterioration of the driving transistor DT can be compensated.

The skip period SP may include an anode initialization period t6, and a boosting period t7, and a light emission period t8.

Figure 12:
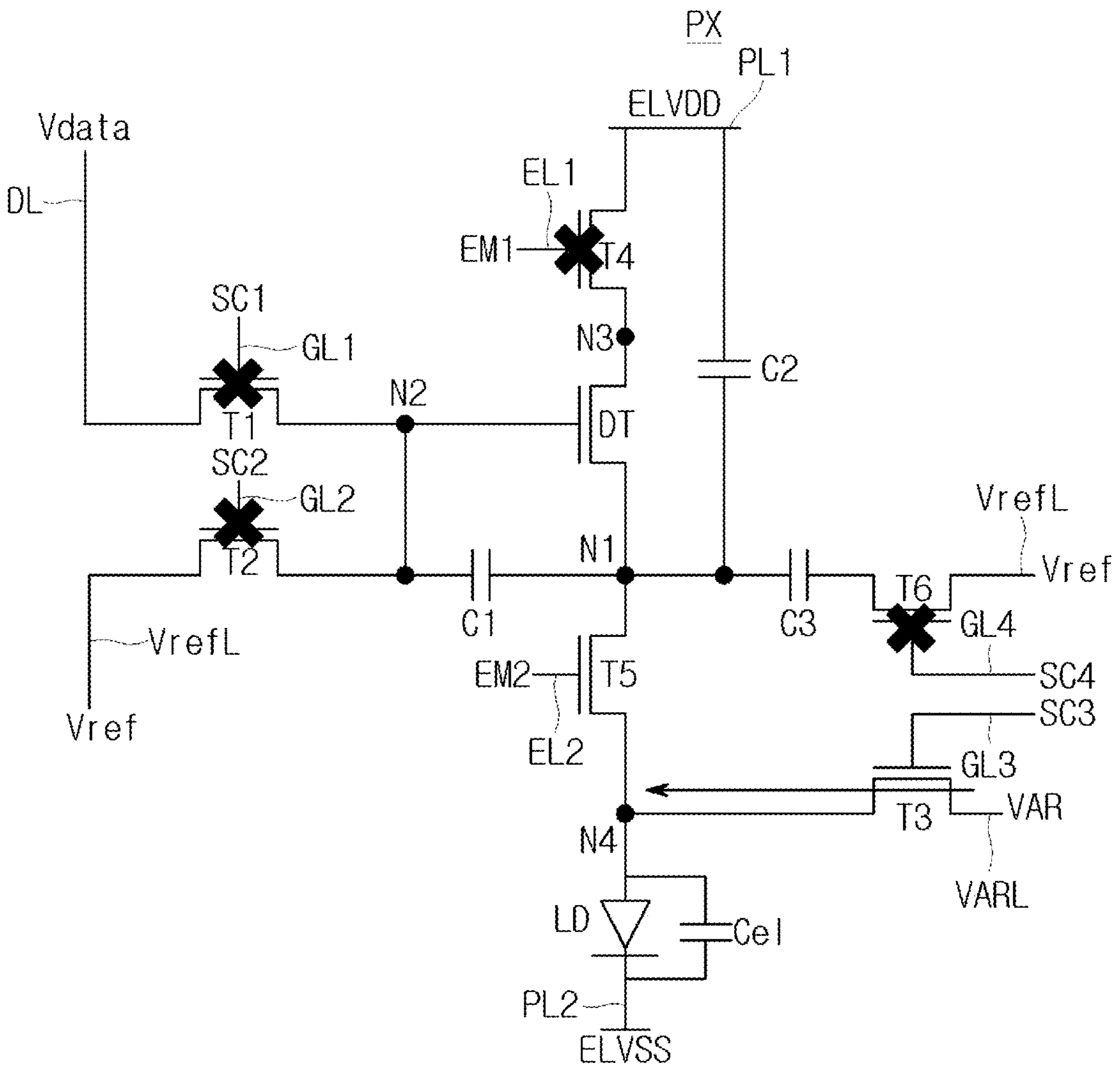

Referring to FIGS. 7 and 12 together, in the anode initialization period t6, the first light emission signal EM1 switches over to a turn-off level and the fourth transistor T4 may be turned off, and the third scan signal SC3 switches over to a turn-on level, and the third transistor T3 may be turned on. When the bias voltage VAR is applied to the fourth node N4 through the third transistor T3 which is turned on, the anode electrode of the light emitting diode LD may be initialized to the bias voltage VAR.

In the anode initialization period t6, the light emitting diode LD does not emit light by the bias voltage VAR applied to the anode electrode of the light emitting diode LD. Instead, by the first capacitor C1 and the second capacitor C2, a voltage of the gate electrode of the driving transistor DT may be maintained as a voltage programmed in the previous refresh period RP.

Meanwhile, in the anode initialization period t6, as the bias voltage VAR is directly applied to anode electrode of the light emitting diode LD, a voltage of the anode electrode may be discharged at a relatively fast velocity, and a discharge delay of the light emitting diode LD may be improved. Through such anode initialization, deviation of the integrated quantity of luminance due to the refresh rate does not occur, and the flicker due to a difference in the integrated quantity of luminance can be suppressed.

In the boosting period t7, the third scan signal SC3 switches over to a turn-off level, the first light emission signal EM1 switches over to a turn-on level, the third transistor T3 may be turned off, and the fourth transistor T4 may be turned on.

A current path, which starts from the high potential driving voltage ELVDD, passes through the driving transistor DT, and reaches the light emitting diode LD, is formed through the fourth and fifth transistors T4 and T5 which are turned on. As a result, in the boosting period t7, voltages of the first node N1 and the second node N2 rise to a turn-on voltage of the light emitting diode LD, and the capacitor Cel of the light emitting diode LD may be charged.

During the light emission period t8, the light emitting diode LD may emit light at luminance in correspondence with the voltage programmed during the previous refresh period SP.

According to the above-described embodiment, the fourth scan signal SC4 is applied in a turn-on level in the non-emission period (for example, the initialization, sampling, and programming periods) of the light emitting diode LD, and is applied in a turn-off level in the light emission period (for example, the boosting, and light emission periods) of the light emitting diode LD in which the light emitting diode LD is boosted or emits light. In other words, the fourth scan signal SC4 is applied in a turn-on level when the second light emission signal EM2 is applied in a turn-off level and is applied in a turn-off level when the second light emission signal EM2 is applied in a turn-on level.

The sixth transistor T6 is turned on in response to a turn-on level of the fourth scan signal SC4, and the third capacitor C3 stores the threshold voltage Vth while the sixth transistor T6 is turned on. The sixth transistor T6 is turned off in response to a turn-off level of the fourth scan signal SC4, and the third capacitor C3 is floated while the sixth transistor T6 is turned off.

Figure 13:
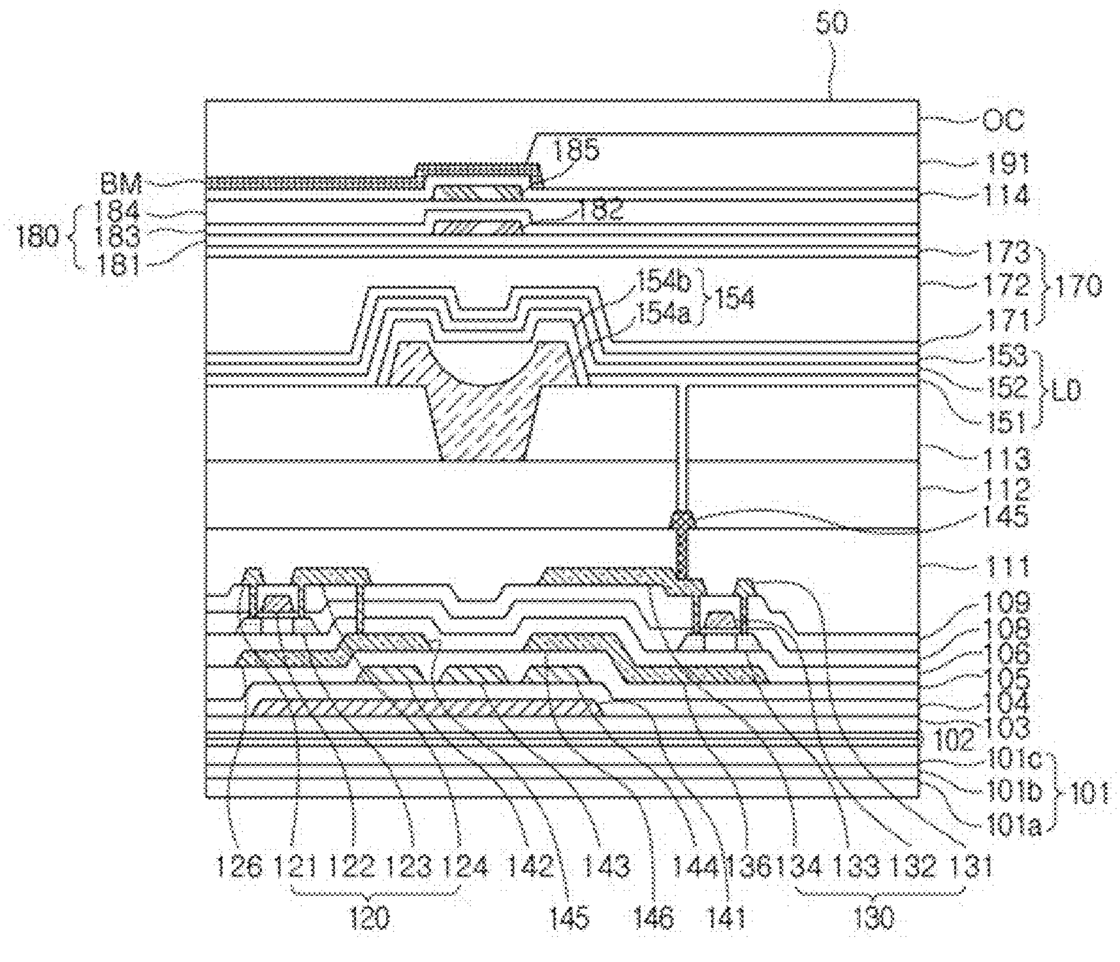
FIG. 13 is a cross-sectional view illustrating a lamination form of a display device according to an embodiment.

FIG. 13 is a cross-sectional view illustrating a lamination form of the display device according to an embodiment.

Referring to FIG. 13, the display panel 50 may include a substrate 101, a first thin film transistor 120, a second thin film transistor 130, the light emitting diode LD, an encapsulation unit 170, a touch unit 180, a filter insulation layer 114, a black matrix BM, a color filter 191, and a planarization layer OC, etc. The display panel 50 may include at least one panel insulation layer and at least one touch insulation layer between the substrate 101 and the light emitting diode LD.

The substrate 101 may include one or more plastic materials. For example, the substrate 101 may be a multi-structured substrate which includes a plurality of plastic materials such as polyimide and the like. For example, the substrate 101 may include a first substrate portion 101*a* and a second substrate portion 101*b*, each of which includes a plastic material, and may include a third substrate portion 101*c* formed between the first substrate portion 101*a* and the second substrate portion 101*b* and including an inorganic insulation material, but is not limited thereto.

A buffer layer 102 may be disposed on the substrate 101. The buffer layer 102 may minimize or delay dispersion of moisture or oxygen permeating the substrate 101. The buffer layer 102 may be formed by alternately laminating silicon nitride SiNx and silicon oxide SiOx at least once, but is not limited thereto.

A first insulation layer 103 may be disposed on the buffer layer 102. The first insulation layer 103 may be formed of the same material as the buffer layer 102, but is not limited thereto. For example, the first insulation layer 103 may be formed of an inorganic insulation material such as silicon nitride SiNx, silicon oxide SiOx, and the like, but is not limited thereto. In various embodiments, the first insulation layer 103 may be omitted.

On the first insulation layer 103, a first conductive layer may be formed. The first conductive layer may include a first storage electrode 141. The first storage electrode 141 may be formed in a single-layered structure or a multi-layered structure formed of one among molybdenum (Mo), copper (Cu), titanium (Ti), aluminum (Al), chrome (Cr), gold (Au), nickel (Ni), neodymium (Nd), and or a compound thereof, but is not limited thereto.

A second insulation layer 104 may be disposed on the first conductive layer. The second insulation layer 104 may be formed of the same material as the first insulation layer 103 and may prevent an electrical short between the first conductive layer and another component.

A second conductive layer may be formed on the second insulation layer 104. The second conductive layer may include second to fourth storage electrodes 142, 143, and 144. Capacitance may be formed between the second to fourth storage electrodes 142, 143, and 144 and the first storage electrode 141, and the second insulation layer 104 therebetween may serve as the dielectric. The second conductive layer may be formed of the same material as the first conductive layer, but is not limited thereto.

A third insulation layer 105 may be disposed on the second conductive layer. The third insulation layer 105 may be formed of the same material as the second insulation layer 104 and may prevent an electrical short between another component and the second conductive layer.

A third conductive layer may be formed on the third insulation layer 105. The third conductive layer may include a light shielding layer 126. The light shielding layer 126 may prevent transmission of light into semiconductor layers 123 and 133 of the first thin film transistors 120 and second thin film transistor 130. To this end, the light shielding layer 126 may be disposed by overlapping the first and second semiconductor layers 123 and 133. The light shielding layer 126 may be formed of the same material as the first conductive layer, but is not limited thereto.

The third conductive layer may further include fifth and sixth storage electrodes 145 and 146. The fifth storage electrode 145 is formed by overlapping the second storage electrode 142, and capacitance may be formed between the second storage electrode 142 and the fifth storage electrode 145. The sixth storage electrode 146 is formed by overlapping the fourth storage electrode 144, and capacitance may be formed between the fourth storage electrode 144 and the sixth storage electrode 146. In an embodiment, the sixth storage electrode 146 may be electrically connected to the first storage electrode 141 through a contact hole and the like.

The first storage electrode 141, the second storage electrode 142, and the fifth storage electrode 145 may configure one third capacitor C3, the first storage electrode 141 and the third storage electrode 143 may configure one second capacitor C2, and the first storage electrode 141, the fourth storage electrode 144, and the sixth storage electrode 146 may configure one first capacitor C1. The first to third capacitors C1, C2, and C3 may be connected to one another through the first storage electrode 141 serving as the common node. As illustrated, as the first storage electrode 141 is formed as one wide pattern across the first to third capacitors C1, C2, and C3, the capacitance of the first to third capacitors C1, C2, and C3 may increase.

In an embodiment, the fifth and sixth storage electrodes 145 and 146 may be formed as one pattern together with the light shielding layer 126, but are not limited thereto. In addition, the fifth and sixth storage electrodes 145 and 146 may be formed of the same material as the light shielding layer 126, but are not limited thereto.

A fourth insulation layer 106 may be disposed on the third conductive layer. The fourth insulation layer 106 may be formed of the same material as the first insulation layer 103, the second insulation layer 104, and the third insulation layer 105, but is not limited thereto.

On the fourth insulation layer 106, the first thin film transistor 120 and the second thin film transistor 130 may be disposed. The first thin film transistor 120 may include a first source electrode 121, a first gate electrode 122, the first semiconductor layer 123, and a first drain electrode 124.

The first and second semiconductor layers 123 and 133 may be disposed on the fourth insulation layer 106. The first and second semiconductor layers 123 and 133 may include a metal oxide semiconductor such as IGZO (Indium-Gallium-Zinc Oxide), or a silicon-based semiconductor material such as amorphous silicon or polycrystalline silicon, however the embodiments of the present disclosure are not limited thereto. The first and second semiconductor layers 123 and 133 may include a channel region, a source region, and a drain region.

A fifth insulation layer 108 may be disposed on the first and second semiconductor layers 123 and 133. The fifth insulation layer 108 may be formed of the same material as the first insulation layer 103, the second insulation layer 104, the third insulation layer 105, or the fourth insulation layer 106, but is not limited thereto.

The first and second gate electrodes 122 and 132 may be disposed on the fifth insulation layer 108. The first gate electrode 122 may be disposed on the fifth insulation layer 108 to overlap the channel region of the first semiconductor layer 123. The second gate electrode 132 may be disposed on the fifth insulation layer 108 to overlap the channel region of the second semiconductor layer 133. The first and second gate electrodes 122 and 132 may be formed in a single-layered structure or a multi-layered structure formed of one among molybdenum (Mo), copper (Cu), titanium (Ti), aluminum (Al), chrome (Cr), gold (Au), nickel (Ni), neodymium (Nd), and or a compound thereof, but are not limited thereto. The first and second gate electrodes 122 and 132 may be disposed together with a gate line.

A sixth insulation layer 109 may be disposed on the first and second gate electrodes 122 and 132. The sixth insulation layer 109 may be formed of the same material as the first insulation layer 103, the second insulation layer 104, the third insulation layer 105, the fourth insulation layer 106, or the fifth insulation layer 108, but is not limited thereto.

The first source electrode 121, the first drain electrode 124, the second source electrode 131, and the second drain electrode 134 may be disposed on the sixth insulation layer 109.

The first source electrode 121 and the first drain electrode 124 may be electrically connected to the first semiconductor layer 123 through the contact hole. The first source electrode 121 and the first drain electrode 124 may be formed of a metal material. For example, the first source electrode 121 and the first drain electrode 124 may be formed in a single-layered structure or a multi-layered structure formed of one among molybdenum (Mo), aluminum (Al), chrome (Cr), gold (Au), titanium (Ti), nickel (Ni), neodymium (Nd), and copper (Cu), or an alloy thereof, but are not limited thereto.

The second source electrode 131 and the second drain electrode 134 may be formed of the same material as the first source electrode 121 and the first drain electrode 124 and may be disposed on the same layer as the first source electrode 121 and the first drain electrode 124. However, the embodiments of the present disclosure are not limited thereto. For example, the second source electrode 131 and the second drain electrode 134 may be formed in a single-layered structure or a multi-layered structure formed of one among molybdenum (Mo), aluminum (Al), chrome (Cr), gold (Au), titanium (Ti), nickel (Ni), neodymium (Nd), and copper (Cu), or an alloy thereof, but the embodiments of the present disclosure are not limited thereto.

In an embodiment, the first drain electrode 124 may be electrically connected to the fifth storage electrode 145. In addition, the second source electrode 131 may be electrically connected to the sixth storage electrode 146. The second gate electrode 132 may be electrically connected to the fourth storage electrode 124 through a contact hole and the like, which is not illustrated. In this embodiment, the first transistor 120 may be the sixth transistor T6 illustrated in FIG. 5, and the second transistor 130 may be the driving transistor DT illustrated in FIG. 5.

The first source electrode 121, the first drain electrode 124, the second source electrode 131, and the second drain electrode 134 may be disposed together with a data line. For example, the data line may be formed of the same material on the same layer as the first source electrode 121, the first drain electrode 124, the second source electrode 131, and the second drain electrode 134, but is not limited thereto.

A first protection layer 111 may be disposed on the first source electrode 121, the first drain electrode 124, the second source electrode 131, and the second drain electrode 134.

The first protection layer 111 may planarize an upper portion of the first thin film transistor 120 and protect the first thin film transistor 120. The first protection layer 111 may be formed of an organic material. For example, the first protection layer 111 may be formed of an organic material including an acrylic resin, an epoxy resin, a phenolic resin, a polyamide resin, or a polyimide resin, but the embodiments of the present disclosure are not limited thereto.

A second protection layer 112 may be disposed on the first protection layer 111. The second protection layer 112 may be formed of the same material as the first protection layer 111, but is not limited thereto.

A third protection layer 113 may be further disposed on an upper surface of the second protection layer 112. The third protection layer 113 may be formed of the same material as the first protection layer 111 and the second protection layer 112, but is not limited thereto.

A connection electrode 145 may be disposed between the first protection layer 111 and the second protection layer 112.

The connection electrode 145 may electrically connect the first thin film transistor 120 and the light emitting diode LD. The connection electrode 145 may be formed of the same material as the first source electrode 121 and the first drain electrode 124, but is not limited thereto.

The light emitting diode LD may be disposed on the third protection layer 113. The light emitting diode LD may include an anode electrode 151, a light emitting layer 152, and a cathode electrode 153.

The anode electrode 151 may be disposed on the third protection layer 113. The anode electrode 151 may be electrically connected to the first thin film transistor 120 through the contact hole formed on the second protection layer 112.

In an illustrated embodiment, the anode electrode 151 may be directly connected to the first thin film transistor 120 through the connection electrode 145. However, the present embodiment is not limited thereto, and the anode electrode 151 may be connected to the first thin film transistor 120 through another transistor, for example, the fifth transistor T5, as illustrated in FIG. 6, etc.

The anode electrode 151 may be a reflective electrode which reflects light, but the embodiments of the present disclosure are not limited thereto. The anode electrode 151 may include a metal material having a high reflectance such as an APC alloy, a deposition structure (Ti/Al/Ti) of aluminum (Al) and titanium (Ti), and a deposition structure (ITO/Al/ITO) of aluminum (Al) and ITO, and may be formed in a single-layered structure or a multi-layered structure, but is not limited thereto.

The light emitting layer 152 may be disposed on the anode electrode 151. The light emitting layer 152 may include one or more light emitting structures (or light emitting diode or an element) deposited on the anode electrode 151 in the order of a hole transfer layer and an electron transfer layer, or in the reverse order. For example, the hole transfer layer may include a hole transport layer, a hole injection layer, an electron blocking layer, a P-type electric charge generation layer and the like, but is not limited thereto. For example, the electron transfer layer may include an electron transport layer, an electron injection layer, a hole blocking layer, an N-type electric charge generation layer and the like, but is not limited thereto. The light emitting layer 152 may be an organic light emitting layer, an inorganic light emitting layer, a quantum dot light emitting layer, a micro light emitting diode, a micro-mini light emitting diode and the like, but the embodiments of the present disclosure are not limited thereto. For example, the light emitting layer 152 of the display panel 50 may include an organic light emitting layer. The light emitting layer 152 may include a red light emitting layer, a green light emitting layer, and a blue light emitting layer. The light emitting layer 152 may further include a white light emitting layer, but is not limited thereto.

The cathode electrode 153 may be formed on the light emitting layer 152. In an embodiment, the light emitting layer 152 and the cathode electrode 153 may be formed widely on the upper surface of the substrate 101, but are not limited thereto.

A bank 154 may be formed on the second protection layer 112. The bank 154 may be disposed to cover one region, for example, an edge of the anode electrode 151, and expose the remaining other region, for example, a center region of the anode electrode 151 toward an upper portion. The region of the anode electrode 151 not covered by the bank 154 but exposed may be defined as a light emitting region.

The bank 154 may include two or more layers. For example, the bank 154 may include a first bank **154*a*, and a second bank 154*b* between the first bank 154*a* and the light emitting layer 152. The first bank 154*a* may include a black-based material. For example, the first bank 154*a* may be formed of an organic material such as a material including a black pigment and the like, a benzocyclobutene resin, a polyimide resin, an acrylic resin, or photosensitive polymer, but is not limited thereto. When the first bank 154*a* is formed of a material including a black pigment, a black dye and the like, the first bank 154*a* may be a black bank. When forming the first bank 154*a* with a material including a black pigment, a black dye and the like, the first bank 154*a* may block light from the outside or light reflected from the outside, thereby further improving luminance of the display device. The first bank 154*a* may serve to absorb light reflected from a lower side of the bank 154*a* among the light incident from the outside. The second bank 154*b* may include a transparent material. The second bank 154*b*** may be a transparent bank, but is not limited thereto.

In an embodiment, the bank 154 may include a trench recessed in a downward direction as illustrated. The trench may be formed in the first bank **154*a* and the second bank 154*b*. The light emitting layer 152 and the cathode electrode 153 covering the upper portion of the bank 154** may be formed along a form of the trench.

The encapsulation unit 170 may be disposed on the cathode electrode 153. The encapsulation unit 170 may include one or more insulation layers. For example, the encapsulation unit 170 may include a first encapsulation layer 171, a second encapsulation layer 172 disposed on the first encapsulation layer 171, and a third encapsulation layer 173 disposed on the second encapsulation layer 172. The encapsulation unit 170 may include one or more inorganic material layers and one or more organic material layers. For example, the first encapsulation layer 171 and the third encapsulation layer 173 may include an inorganic insulation material, and the second encapsulation layer 172 may include an organic material, but are not limited thereto.

The touch unit 180 may be disposed on the encapsulation unit 170. The touch unit 180 may include a touch buffer layer 181, a first touch conductive layer, a first touch insulation layer 183, a second touch insulation layer 184, and a second touch conductive layer. In an embodiment, a touch light emitting layer may be further disposed on the second touch conductive layer, but is not limited thereto.

The touch buffer layer 181 may be disposed on the encapsulation unit 170. For example, the touch buffer layer 181 may be disposed on the third encapsulation layer 173. The touch buffer layer 181 may be formed of the same material as the buffer layer 102, but the embodiments of the present disclosure are not limited thereto.

A first touch conductive layer may be disposed on the touch buffer layer 181. The first touch conductive layer may include a bridge electrode 182. Each of the bridge electrode 182 and a sensor electrode 185 which will be described below may be disposed in a boundary between adjacent pixels. The bridge electrode 182 and the sensor electrode 185 may overlap the black matrix BM which will be described below in a thickness direction. The black matrix BM may cover the bridge electrode 182 and a sensor electrode 185. Through this configuration, it is possible to prevent the bridge electrode 182 and the sensor electrode 185 from being visible from the outside.

On the first touch conductive layer, the first touch insulation layer 183, and the second touch insulation layer 184 on the first touch insulation layer 183 may be disposed. The first touch insulation layer 183, and the second touch insulation layer 184 on the first touch insulation layer 183 may prevent an electrical short between the first touch conductive layer and the second touch conductive layer. The first touch insulation layer 183 may be formed of silicon nitride SiNx, silicon oxide SiOx, or in a multi-layered structure formed thereof, but the embodiments of the present disclosure are not limited thereto. The second touch insulation layer 184 may include an organic insulation material, but is not limited thereto, and may include the same material as the first touch insulation layer 183.

The second touch conductive layer may be disposed on the second touch insulation layer 184. The second touch conductive layer may include a first sensor electrode **185*a*, and a second sensor electrode 185*b*. The sensor electrode 185 may include the first sensor electrode 185*a* extending in one direction, and the second sensor electrode 185*b* extending in a direction generally perpendicular to the first sensor electrode 185*a***.

The bridge electrode 182 may be electrically connected to the first sensor electrode **185*a* through a contact hole formed in the first touch insulation layer 183, and the second touch insulation layer 184. For example, the first sensor electrode 185*a* and the bridge electrode 182** may extend in a first direction.

The sensor electrode 185 and the bridge electrode 182 may include a metal material. For example, the sensor electrode 185 and the bridge electrode 182 may be formed of titanium (Ti), nickel (Ni), and aluminum (Al), and may be formed in a three-layered structure of titanium (Ti)/aluminum (Al)/nickel (Ni), but are not limited thereto.

The filter insulation layer 114 may be formed on the second touch conductive layer. The filter insulation layer 114 may be formed of an inorganic insulation material such as silicon nitride SiNx, silicon oxide SiOx, and the like, but is not limited thereto.

The black matrix BM may be disposed on the filter insulation layer 114. The black matrix BM may include a black-based material. For example, the black matrix BM may include a material which can shield something from the light or a material which can absorb the light. For example, the black matrix BM may be configured with a material which includes a black pigment, a black dye, and the like. The black matrix BM may cover the bridge electrode 182 and the sensor electrode 185. Through this configuration, it is possible to prevent the bridge electrode 182 and the sensor electrode 185 from being visible from the outside. For example, a width of the black matrix BM may be smaller than a width of the bank 154.

The color filter 191 may be disposed on the black matrix BM. The color filter 191 may block or transmit a certain color from the light which is emitted in the light emission region. For example, the color filter 191 may be in direct contact with each of a side surface and an upper surface of the black matrix BM.

The planarization layer OC may be disposed on the color filter 191. The planarization layer OC may serve to planarize a level difference formed by the color filter 191. For example, the color filter 191 may include an organic insulation material.

Figure 14:
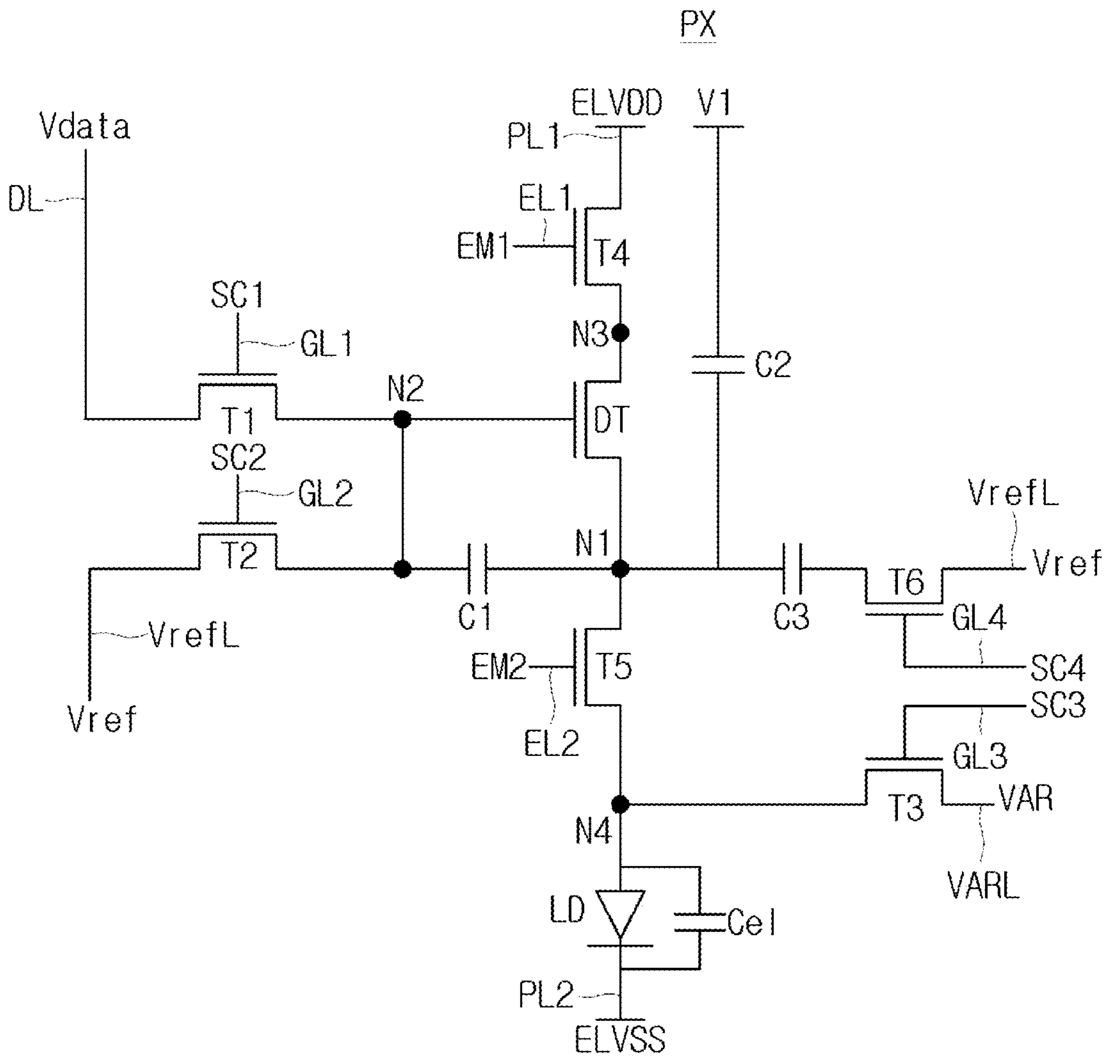
FIG. 14 is a circuit diagram according to a third embodiment.

FIG. 14 is a circuit diagram according to a third embodiment.

In comparison with the embodiment in FIG. 6, in the embodiment in FIG. 14, a second capacitor C2' is connected between a separate capacitor driving voltage V1 and the first node N1. In this embodiment, the capacitor driving voltage V1 may be a voltage which is generally the same as the high potential driving voltage ELVDD, or lower than the high potential driving voltage ELVDD.

The capacitor driving voltage V1 is a direct current (DC) voltage and allows the threshold voltage Vth of the pixel PX to be more accurately compensated by supplying a voltage stably to the second capacitor C2' while the pixel PX is driven.

Except the connection relationship with the second capacitor C2', the structure of the pixel PX according to the third embodiment is substantially the same as that of FIG. 6, therefore, the method for operating the pixel is substantially the same as what is illustrated in FIG. 7. Therefore, the detailed description of the method will be omitted.

Figure 15:
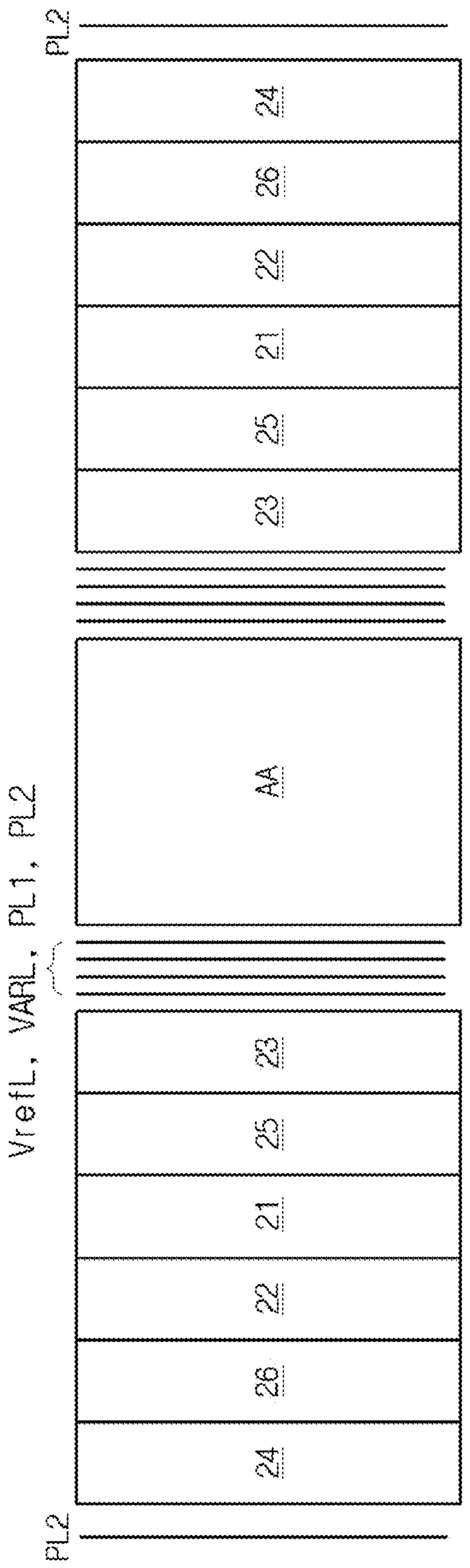
FIG. 15 is a block diagram illustrating a configuration of a gate driver according to an embodiment.

FIG. 15 is a block diagram illustrating a configuration of the gate driver according to an embodiment.

Referring to FIG. 15, the display panel 50 may include a display region AA in which an image is displayed and a non-display region NA around the display region AA and in which an image is not displayed.

In the display region AA, an array of the pixels PX (FIG. 1) is disposed. In the non-display region, at least some of the driver may be mounted or connected. For example, the gate driver 20 may be disposed on one side or both sides (for example, a left side or a right side) of the non-display region as illustrated. The gate driver 20 disposed on both sides of the non-display region may be configured in a form in which both gate drivers 20 on the right side and the left side are symmetrical to each other (a mirrored form). Hereinafter, the configuration will be described based on the gate driver 20 disposed on the left side of the display region AA.

The gate driver 20 may be formed with first to sixth shift registers 21 to 26.

The first to fourth shift registers 21 to 24 configure a scan driving circuit 10A (FIG. 1), and are configured to output scan signals SC1, SC2, SC3, and SC4 (FIG. 6). For example, the first shift register 21 sequentially outputs the first scan signal SC1 through the first scan lines GL1, the second shift register 22 sequentially outputs the second scan signal SC2 through the second scan lines GL2, the third shift register 23 sequentially outputs the third scan signal SC3 through the third scan lines GL3, and the fourth shift register 24 sequentially outputs the fourth scan signal SC4 through the fourth scan lines GL4.

Each of the first to fourth shift registers 21 to 24 may be configured as stage circuits dependently connected to each other. Each of the stage circuits is connected to corresponding scan line GL1, GL2, GL3, and GL4, and may output the scan signal SC1, SC2, SC3, and SC4 to the scan lines GL1, GL2, GL3, and GL4.

The first to fourth scan signals SC1, SC2, SC3, and SC4 may be used to drive at least one transistor provided in the pixel PX. For example, the first to fourth scan signals SC1, SC2, SC3, and SC4 may be used to program the image data DATA (FIG. 1) into the pixel PX, initialize a voltage stored in the pixel PX, or compensate a characteristic of the circuit element.

The fifth and sixth shift registers 25 and 26 configure the light emission driving circuit 20B (FIG. 1) and are configured to output the light emission signals EM1 and EM2 (FIG. 6). For example, the fifth shift register 25 outputs the first light emission signal EM1 through the first light emission lines EL1, and the sixth shift register 26 may output the second light emission signal EM2 through the second light emission lines EL2.

The first light emission signal EM1 and the second light emission signal EM2 may be used to drive at least one transistor provided in the pixel PX. For example, the first light emission signal EM1 and the second light emission signal EM2 may be used to control light emission of the pixel PX.

In the illustrated embodiment, the third shift register 23 may be disposed adjacent to the display region AA, and the fourth shift register 24 may be disposed away from the display region AA. Between the third shift register 23 and the fourth shift register 24, the first and second shift registers 21 and 22 may be disposed to be sequentially away from the display region AA.

The fifth and sixth shift registers 25 and 26 may be disposed to be sequentially away from the display region AA. At this instance, the first to fourth shift registers 21 to 24 may be disposed to be adjacent to one among the fifth and sixth shift registers 25 and 26. For example, the first and third shift registers 21 and 23 may be disposed to be adjacent to the fourth shift register 24, and the second and fourth shift registers 22 and 24 may be disposed to be adjacent to the fifth shift register 25.

Arrangements of the shift registers 21 to 26 are not limited to what is illustrated. Arrangements of the shift registers 21 to 26 may be variously changed in a possible range so as to decrease a size of the non-display region and reduce a length and a quantity of the lines according to specifications of the display panel 50.

In an embodiment, various power lines may be disposed between the display region AA and the gate driver 20. For example, the reference voltage line VrefL, the bias voltage line VARL, the high potential driving voltage line PL1, and the low potential driving voltage line PL2 may be disposed between the display region AA and the gate driver 20.

In addition, according to the embodiment, dummy pixels may be further disposed between the power lines and the display region AA, but the embodiment is not limited thereto.

In an embodiment, the low potential driving voltage line PL2 may be further disposed on an outside of the gate driver 20.

Meanwhile, in FIG. 15, areas of the shift registers 21 to 26 are illustrated to be identical, but are not limited thereto. For example, areas of the shift registers 21 to 26 may be different from one another, and for example, the area of the first shift register 21 may be the greatest.

Figure 16:
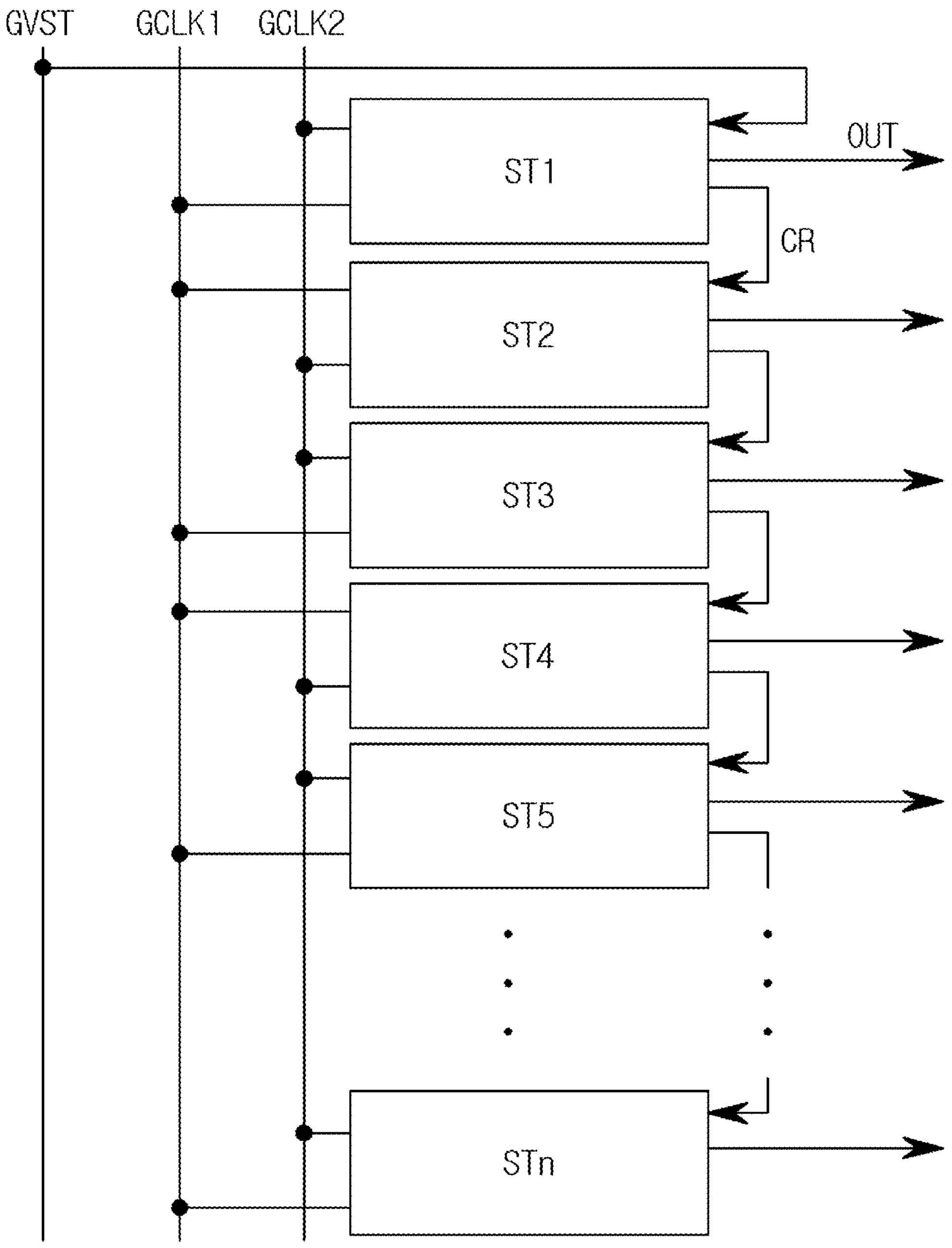
FIG. 16 is a diagram illustrating a connection relationship between stage circuits of a gate driver according to an embodiment.

FIG. 16 is a diagram illustrating a connection relationship between stage circuits of the gate driver according to an embodiment.

In more detail, FIG. 16 shows stage circuits of one among the first to sixth shift registers 21 to 26 illustrated in FIG. 15.

Referring to FIG. 16, each of the first to sixth shift registers 21 to 26 may include a plurality of stage circuits ST1 to STn.

The stage circuits ST1 to STn may be connected dependently. For example, the second stage circuit ST2 may be dependently connected to the first stage circuit ST1, the third stage circuit ST3 may be dependently connected to the second stage circuit ST2, and the fourth stage circuit ST4 may be dependently connected to the third stage circuit ST3.

The stage circuits ST1 to STn may have substantially the same configuration.

The stage circuits ST1 to STn are configured to receive a gate start signal GVST and gate clock signals GCLK1 and GCLK2 applied from the level shifter 11 (FIG. 1). In an illustrated embodiment, two gate clock signals GCLK1 and GCLK2 are applied to the stage circuits ST1 to STn, but the present embodiment is not limited thereto, and fewer or a greater number of clock signals may be provided to the stage circuits ST1 to STn.

The gate clock signals GCLK1 and GCLK2 may be clock signals having the same waveforms and have phases which are shifted at a certain interval. For example, a phase of the first gate clock signal GCLK1 is not shifted, and a phase of the second gate clock signal GCLK2 may be shifted by ½ period with respect to the first gate clock signal GCLK1. The stage circuits ST1 to STn may be configured to receive corresponding one among the gate clock signals GCLK1 and GCLK2.

The first stage circuit ST1 is configured to receive the gate start signal GVST. Rear-end stage circuits ST2 t STn may receive carry signals CR of front-end stage circuits ST1 to STn−1.

Each of the stage circuits ST1 to STn may output a gate signal or a light emission signal to corresponding output lines OUT. Each of the stage circuits ST1 to STn may may be pulled up by one among the gate clock signals GCLK1 and GCLK2 and output the gate clock signals GCLK1 and GCLK2. In addition, each of the stage circuits ST1 to STn may output the carry signal CR to the next connected stage circuit.

Each of the stage circuits ST1 to STn may be reset by being pulled down by the other among the gate clock signals GCLK1 and GCLK2.

Figure 17:
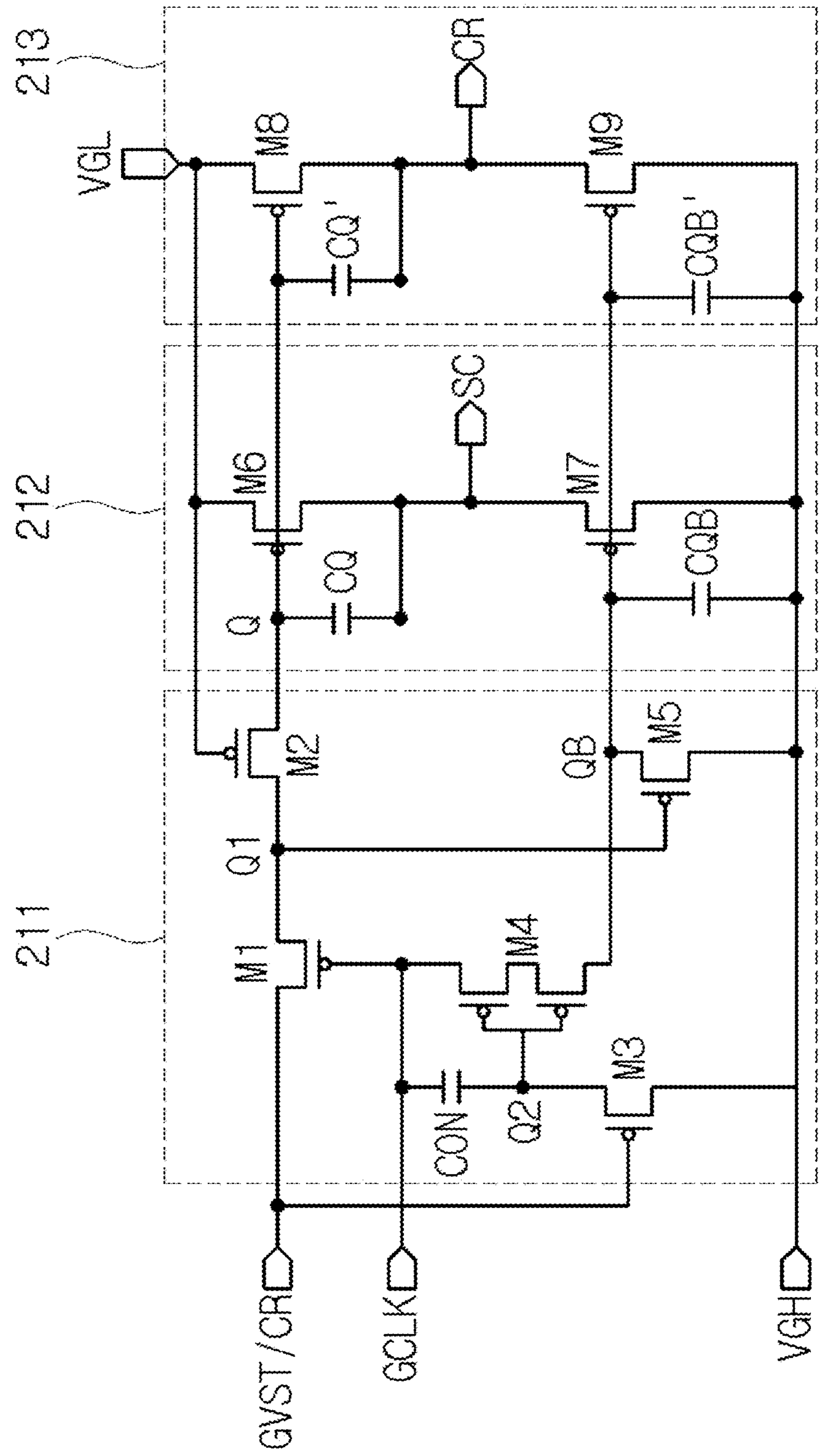
FIG. 17 is a diagram illustrating stage circuits of a gate driver according to an embodiment.

FIG. 17 is a diagram illustrating the stage circuits of the gate driver according to an embodiment. In more detail, FIG. 17 shows the stage circuit of the shift register 21 to 24 which outputs the scan signal SC1 to SC4 (FIG. 16).

Referring to FIG. 17, the stage circuit includes a Q node, and a QB node. In addition, the stage circuit includes a node control unit 211, and output buffer units 212 and 213.

The node control unit 211 discharges the Q node and the QB node to a low level or charges the Q node and the QB node to a high level, in response to the gate clock signal GCLK. The node control unit 211 may include first to sixth transistor M1 to M6, and a first capacitor CON.

A first transistor M1 is connected between the gate start signal GCST or an input terminal of the carry signal CR of the front end stage circuit and a Q1 node Q1. The first transistor M1 sets the Q1 node Q1 to a voltage level of the carry signal CR of the front end stage circuit or the gate start signal GCST in response to the gate clock signal GCLK. When the gate clock signal GCLK is in a low level, the first transistor M1 is turned on, therefore, the first transistor M1 may set the Q1 node Q1 to a voltage level (for example, a low level or a high level) corresponding to the carry signal CR of the front end stage circuit or the gate start signal GCST.

The second transistor M2 may be connected between the Q1 node Q1 and the Q node Q. The second transistor M2 may maintain a turn-on state in response to the gate low voltage VGL. The second transistor M2 may electrically connect the Q1 node Q1 and the Q node Q to each other.

The third transistor M3 is connected between a Q2 node Q2 and a gate high voltage VGH. The third transistor M3 may connect the Q2 node Q2 and the gate high voltage VGH in response to the gate start signal GVST or the carry signal CR of the front-end stage circuit. While the gate start signal GVST or the carry signal CR of the front-end stage circuit is applied in a low level, the third transistor M3 is turned on, and therefore, a voltage of the Q2 node Q2 may be set to a level of the gate high voltage VGH.

The fourth transistor M4 is connected between an input terminal of the gate clock signal GCLK and the QB node QB. The fourth transistor M4 sets the QB node QB to a voltage level corresponding to the gate clock signal GCLK in response to the voltage of the Q2 node Q2. When the Q2 node Q2 is set to a low level, the fourth transistor M4 is turned on, and therefore, the fourth transistor M4 may set a voltage of the QB node QB to a level corresponding to the gate clock signal GCLK, for example, a low level.

In an embodiment, the fourth transistor M4 may be configured with a plurality of sub-transistors connected in series. However, the fourth transistor M4 is not limited thereto.

The fifth transistor M5 is connected between QB node QB and the gate high voltage VGH. The fifth transistor M5 is turned on when the Q1 node Q1 is set to a low level and may set the QB node QB as the gate high voltage VGH.

The first capacitor CON is connected between an input terminal of the gate clock signal CLK and the Q2 node Q2. The first capacitor CON may store a voltage corresponding to a difference between a voltage of the gate clock signal CLK and a voltage of the Q2 node Q2.

The first output buffer unit 212 may output a scan signal SC in response to voltages of the Q node Q and the QB node QB. The first output buffer unit 212 may include a sixth transistor M6 and a seventh transistor M7.

The sixth transistor M6 is connected between the gate low voltage VGL and an output node. The sixth transistor M6 is turned on when a voltage of the Q node Q is discharged to a low level, and outputs the gate low voltage VGL as the scan signal SC.

A second capacitor CQ is connected between a gate and a drain of the sixth transistor M6. When the scan signal SC is output, the second capacitor CQ bootstraps a voltage of the Q node Q to a boosting voltage level which is lower than the low level, in synchronization with the scan signal SC in a low level. When the voltage of the Q node Q is bootstrapped, the scan signal SC in a low voltage level can be output quickly and without distortion.

The seventh transistor M7 is connected between the gate high voltage VGH and the output node. The seventh transistor M7 is turned on when a voltage of the QB node QB is in a low level, and outputs the gate high voltage VGH as the scan signal SC.

A third capacitor CQB is connected between a gate and a drain of the seventh transistor M7. When the scan signal SC is output, the third capacitor CQB bootstraps a voltage of the QB node QB to a boosting voltage level which is lower than the low level, in synchronization with the scan signal SC in a high level. When the voltage of the QB node QB is bootstrapped, the gate high voltage VGH in a high voltage level can be output quickly and without distortion.

The second output buffer unit 213 may output a carry signal CR in response to voltages of the Q node Q and the QB node QB. The second output buffer unit 213 may include an eighth transistor M8 and a ninth transistor M9.

The eighth transistor M8 is connected between the gate low voltage VGL and the output node. The eighth transistor M8 is turned on when a voltage of the Q node Q is discharged to a low level, and outputs the gate low voltage VGL as the carry signal CR.

A fourth capacitor CQ' is connected between a gate and a drain of the eighth transistor M8.

The ninth transistor M9 is connected between the gate high voltage VGH and the output node. The ninth transistor M9 is turned on when a voltage of the QB node QB is in a low level, and outputs the gate high voltage VGH as the carry signal CR.

A fifth capacitor CQB' is connected between a gate and a drain of the ninth transistor M9.

Figure 18:
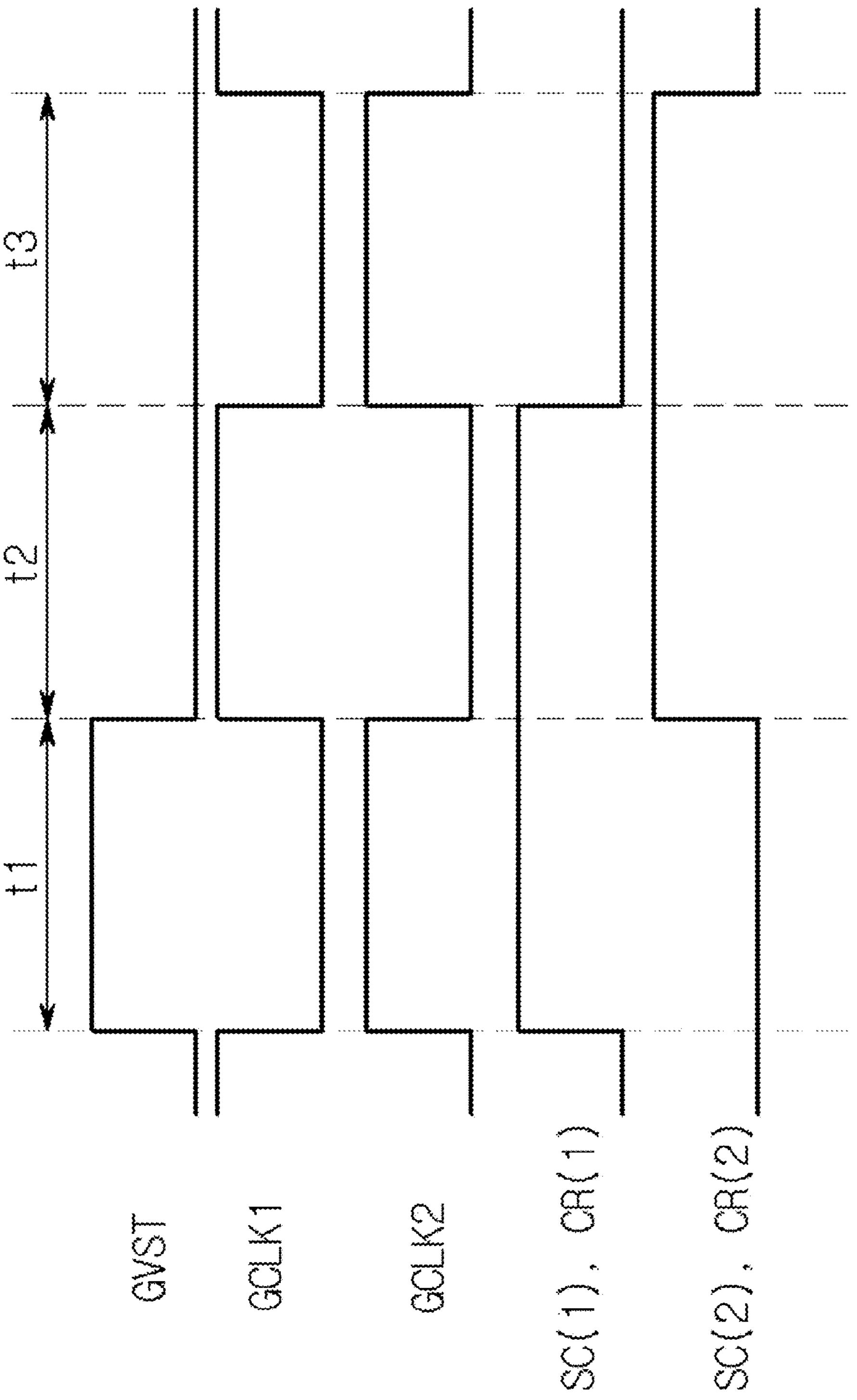
FIG. 18 is a diagram illustrating a method for operating a stage circuit illustrated in FIG. 17 according to an embodiment.

FIG. 18 is a diagram illustrating a method for operating a stage circuit illustrated in FIG. 17 according to an embodiment. In more detail, FIG. 18 shows an example of the input/output signal with respect to the first stage circuit and the second stage circuit in FIG. 16.

Referring to FIGS. 16 to 18 together, before the first period t1, a voltage of the Q node Q of the stage circuits is set to be in a low level, and a voltage of the QB node QB thereof is set to be in a high level. In the embodiment, the gate low voltage VGL is output as the scan signal SC(1) and SC(2), and the transistors of the connected pixel PX (FIG. 3) may be turned off.

In the first period t1, the gate start signal GVST in a high level and the first gate clock signal GCLK1 in a low level are applied to the first stage circuit. Then, the first transistor M1 may be turned on in response to the first gate clock signal GCLK1 in a low level, and as the Q2 node Q2 is set to be a low level, thereby the fourth transistor M4 can be turned on.

When the first transistor M1 is turned on, a voltage of the Q1 node Q1 is set to a high level corresponding to the gate start signal GVST, and through the second transistor M2 in a turn-on state, a voltage of the Q node Q may be set to a high level. Then, the fifth transistor T5, the sixth transistor T6, and the eighth transistor T8 are turned off.

When the fourth transistor M4 is turned on, the first gate clock signal GCLK1 in a low level is delivered to the QB node QB, thereby the voltage of the QB node QB may be set to a low level. Then, the seventh transistor T7 and the ninth transistor T9 are turned on, and the gate high voltage VGH is output as the first scan signal SC(1) and the first carry signal CR(1), thereby the transistors of the connected pixel PX can be turned on.

In the first period t1, the first carry signal CR(1) in a high level and the second gate clock signal GCLK2 in a high level are applied to the second stage circuit. The transistors M1, M3 and M4 connected to the first carry signal CR(1) and the second gate clock signal GCLK2 get into a turn-off state, and do not affect the voltage of the Q node Q and the QB node QB, thereby the second stage circuit may maintain the same state as the previous step.

In the second period t2, the gate start signal GVST in a low level and the first gate clock signal GCLK1 in a high level are applied to the first stage circuit. Then, the third transistor M3 is turned on in response to the gate start signal GVST in a low level, and the first transistor M1 is turned off in response to the first gate clock signal GCLK1 in a high level. When the second transistor M2 is turned on, the gate high voltage VGH may be applied to the Q2 node N2. Then, the fourth transistor M4 is turned off.

As the first transistor M1 and the fourth transistor M4 are turned off, the voltage of the Q node Q and the QB node QB may maintain the same state as the previous state, and the first carry signal CR(1) and the first scan signal SC(1) in a high level may continue being output.

In the second period t2, the first carry signal CR(1) in a high level and the second gate clock signal GCLK2 in a low level are applied to the second stage circuit. Then, the first transistor M1 may be turned on in response to the second gate clock signal GCLK2 in a low level, and the fourth transistor M4 may be turned on as the Q2 node Q2 is set to a low level.

As the first transistor M1 is turned on, the voltage of the Q1 node Q1 is set to a high level corresponding to the first carry signal CR(1), and through the second transistor M2 in a turn-on state, the voltage of the Q node Q may be set to a high level. Then, the fifth transistor T5, the sixth transistor T6, and the eighth transistor T8 are turned off.

When the fourth transistor M4 is turned on, the second gate clock signal GCLK2 in a low level is delivered to the QB node QB, thereby the voltage of the QB node QB may be set to a low level. Then, the seventh transistor T7 and the ninth transistor T9 are turned on, and the gate high voltage VGH is output as the second scan signal SC(2) and the second carry signal CR(2), thereby the transistors of the connected pixel PX can be turned on.

In the third period t3, the gate start signal GVST in a low level and the first gate clock signal GCLK1 in a low level are applied to the first stage circuit. Then, the third transistor M2 may be turned on in response to the gate start signal GVST in a low level, and the first transistor M1 may be turned on in response to the first gate clock signal GCLK1 in a low level.

When the first transistor M1 is turned on, the voltage of the Q1 node Q1 may be set to a low level corresponding to the gate start signal GVST, and the voltage of the Q node Q may be set to a low level through the second transistor M2 in a turn-on state. Then, the sixth transistor T6 and the eighth transistor T8 may be turned on, and the gate low voltage VGL may be output as the first scan signal SC(1) and the first carry signal CR(1).

Meanwhile, in response to the Q1 node Q1 in a low level, the fifth transistor M5 may be turned on. Then, the voltage of the QB node QB may be set as the gate high voltage VGH, and the seventh transistor M7 and the ninth transistor M9 may be turned off.

When the third transistor M3 is turned on, the voltage of the Q2 node Q2 is set as the gate high voltage VGH, and the fourth transistor M4 may be turned off. At this instance, the first capacitor CON may store a voltage between the first gate clock signal GCLK1 in a low level and the gate high voltage VGH in a high level.

In the third period t3, the first carry signal CR(1) in a low level and the second gate clock signal GCLK2 in a high level are applied to the second stage circuit. Then, the third transistor M3 is turned on in response to the first carry signal CR(1) in a low level, and the first transistor M1 is turned off in response to the second gate clock signal GCLK2 in a high level. When the third transistor M3 is turned on, the gate high voltage VGH may be applied to the Q2 node Q2. Then, the fourth transistor M4 may be turned off.

As the first transistor M1 and the fourth transistor M4 are turned off, the voltages of the Q node Q and the QB node QB maintain the previous state, and the second carry signal CR(2) and the second scan signal SC(2) in a high level continue being output.

In the fourth period t4, the first carry signal CR(1) in a low level and the second gate clock signal GCLK2 in a low level are applied to the second stage circuit. At this instance, operations of the second stage circuit are the same as the operations of the first stage circuit in the third period t3. That is, the second stage circuit may output the second carry signal CR(2) and the second scan signal SC(2) of the gate low voltage VGL.

In the manner described above, the gate driver 20 may output the scan signal SC sequentially to the pixel rows.

The embodiments of the present disclosure have been described with reference to accompanying drawings. Those of ordinary skill in the art will recognize that the present disclosure may be embodied in other specific forms without departing from its spirit or essential characteristics. The described embodiments are to be considered in all respects only as illustrative and not restrictive. The scope of the present disclosure is therefore indicated by the appended claims rather than by the foregoing description. All changes which come within meaning and range of equivalency of the claims are to be embraced within the scope of the present disclosure.

What is claimed is:

1. A pixel, comprising:

a light emitting diode;

a driving transistor connected to a high potential driving voltage line and a first node, the driving transistor having a gate electrode connected to a second node;

a switching transistor connected to a data line and the second node, the switching transistor having a gate electrode configured to receive a first scan signal;

an initialization transistor connected to a reference voltage line and the second node, the initialization transistor having a gate electrode configured to receive a second scan signal;

a first capacitor connected to the first node and the second node;

a second capacitor having one electrode connected to the first node;

a third capacitor connected to the first node and the reference voltage line; and a compensation transistor connected to the third capacitor and the reference voltage line, the compensation transistor having a gate electrode configured to receive a fourth scan signal, wherein the third capacitor and the compensation transistor are connected in series between the first node and the reference voltage line.

2. The pixel of claim 1, wherein the third capacitor stores a voltage corresponding to a threshold voltage of the driving transistor while the compensation transistor is turned on during a non-emission period of the light emitting diode, and the third capacitor is floated while the compensation transistor is turned off during an emission period of the light emitting diode.

3. The pixel of claim 1, wherein the fourth scan signal is applied in a turn-on level during a non-emission period of the light emitting diode and is applied in a turn-off level during an emission period of the light emitting diode.

4. The pixel of claim 1, further comprising:

a first light emitting transistor connected to the high potential driving voltage line and the driving transistor, the first light emitting transistor having a gate electrode configured to receive a first light emission signal;

a second light emitting transistor connected to the first node and the light emitting diode, the second light emitting transistor having a gate electrode configured to receive a second light emission signal; and an anode initialization transistor connected to the light emitting diode and a bias voltage line, the anode initialization transistor having a gate electrode configured to receive a third scan signal.

5. The pixel of claim 4, wherein the fourth scan signal is applied in a turn-on level when the second light emission signal is applied in a turn-off level and the fourth scan signal is applied in a turn-off level when the second light emission signal is applied in a turn-on level.

6. The pixel of claim 4, wherein the driving transistor, the switching transistor, the initialization transistor, the compensation transistor, the first light emitting transistor, and the second light emitting transistor are oxide thin film transistors.

7. The pixel of claim 1, wherein an area of the second capacitor and an area of the third capacitor are smaller than an area of the first capacitor.

8. The pixel of claim 1, further comprising:

a substrate;

a first insulation layer on the substrate;

a first storage electrode on the first insulation layer;

a second insulation layer on the first storage electrode;

a second storage electrode to a fourth storage electrode on the second insulation layer and having at least one region thereof, respectively, overlapping the first storage electrode;

a third insulation layer on the second storage electrode to the fourth storage electrode;

a fifth storage electrode and a sixth storage electrode on the third insulation layer and overlapping the second storage electrode and the fourth storage electrode, respectively;

a fourth insulation layer on the fifth storage electrode and the sixth storage electrode;

wherein the driving transistor is on the fourth insulation layer and the light emitting diode is on the driving transistor.

9. The pixel of claim 8, wherein the first storage electrode, the fourth storage electrode, and the sixth storage electrode configure the first capacitor, wherein the first storage electrode and third storage electrode configure the second capacitor, and wherein the first storage electrode, the second storage electrode, and the fifth storage electrode configure the third capacitor.

10. The pixel of claim 1, wherein another electrode of the second capacitor is connected to the high potential driving voltage line or a capacitor driving voltage line.

11. A display device, comprising:

a display panel having an arrangement of pixels;

a data driver configured to apply a data voltage to the pixels;

a gate driver configured to apply a first scan signal, a second scan signal, a third scan signal, a fourth scan signal, a first light emission signal and a second light emission signal to the pixels; and a timing controller configured to control an operation timing of the data driver and the gate driver, wherein each of the pixels comprises:

a light emitting diode;

a driving transistor connected to a high potential driving voltage line and a first node, the driving transistor having a gate electrode connected to a second node;

a switching transistor configured to apply the data voltage to the second node in response to the first scan signal;

an initialization transistor configured to apply a reference voltage to the second node in response to the second scan signal;

an anode initialization transistor configured to apply a bias voltage to the light emitting diode in response to the third scan signal;

a first light emitting transistor connecting the high potential driving voltage line and the driving transistor to each other in response to the first light emission signal;

a second light emitting transistor connecting the first node and the light emitting diode to each other in response to the second light emission signal;

a first capacitor connected to the first node and the second node;

a second capacitor having one electrode connected to the first node;

a third capacitor connected to the first node and a reference voltage line; and a compensation transistor connecting the third capacitor and the reference voltage line to each other in response to the fourth scan signal.

12. The display device of claim 11, wherein the gate driver applies the fourth scan signal in a turn-on level while applying the second light emission signal in a turn-off level, and applies the fourth scan signal in a turn-off level while applying the second light emission signal in an turn-on level.

13. The display device of claim 11, wherein the third capacitor stores a voltage corresponding to a threshold voltage of the driving transistor while the compensation transistor is turned on in response to the fourth scan signal, and is floated while the compensation transistor is turned off in response to the fourth scan signal.

14. The display device of claim 11, wherein the display panel includes a display region in which the pixels are disposed and a non-display region disposed around the display region, wherein the gate driver includes shift registers disposed on a left side and a right side of the display region in the non-display region, the shift registers configured in a form symmetrical to each other on left and right sides.

15. The display device of claim 14, wherein the shift registers include:

a first shift register configured to output the first scan signal;

a second shift register configured to output the second scan signal;

a third shift register configured to output the third scan signal;

a fourth shift register configured to output the fourth scan signal;

a fifth shift register configured to output the first light emission signal; and a sixth shift register configured to output the second light emission signal, wherein the third shift register is adjacent to the display region, wherein the fourth shift register is farthest from the display region, and wherein the first shift register to the fourth shift register are adjacent to one among the fifth shift register and the sixth shift register.

16. A method for operating a display device comprising a display panel having an arrangement of a pixel, a data driver configured to apply a data voltage to the pixel, a gate driver configured to apply a scan signal and a light emission signal to the pixel, and a timing controller configured to control an operation timing of the data driver and the gate driver, the method comprising:

in a refresh period in one frame, an initializing step during which the gate driver applies a second scan signal, a third scan signal, a fourth scan signal, and a second light emission signal in a turn-on level;

a sampling step during which the gate driver converts the second light emission signal into a turn-off level and applies a first light emission signal in the turn-on level;

a programming step during which the gate driver converts the second scan signal and the first light emission signal into the turn-off level, and applies a first scan signal in the turn-on level, and the data driver applies the data voltage;

a boosting step during which the gate driver converts the first scan signal, the third scan signal, and the fourth scan signal into the turn-off level, and converts the first light emission signal and the second light emission signal into the turn-on level; and a light emitting step during which the pixel emits light at a luminance corresponding to the data voltage.

17. The method for operating a display device of claim 16, further comprising:

in a skip period of the one frame, an anode initializing step during which the gate driver applies the third scan signal and the second light emission signal in the turn-on level, and applies the first light emission signal in the turn-off level;

a boosting step during which the gate driver converts the third scan signal into the turn-off level and converts the first light emission signal into the turn-on level; and a light emitting step during which the pixel emits light at luminance corresponding to the data voltage.

18. The method for operating a display device of claim 16, wherein the pixel includes:

a light emitting diode;

a driving transistor connected to a high potential driving voltage line and a first node, the driving transistor having a gate electrode connected to a second node;

a switching transistor connected to a data line and the second node, the switching transistor having a gate electrode configured to receive a first scan signal;

an initialization transistor connected to a reference voltage line and the second node, the initialization transistor having a gate electrode configured to receive a second scan signal;

a first light emitting transistor connected to the high potential driving voltage line and the driving transistor, the first light emitting transistor having a gate electrode configured to receive a first light emission signal;

a second light emitting transistor connected to the first node and the light emitting diode, the second light emitting transistor having a gate electrode configured to receive a second light emission signal;

an anode initialization transistor connected to the light emitting diode and a bias voltage line, the anode initialization transistor having a gate electrode configured to receive a third scan signal;

a first capacitor connected to the first node and the second node;

a second capacitor having one electrode connected to the first node;

a third capacitor connected to the first node and the reference voltage line; and a compensation transistor connected to the third capacitor and the reference voltage line, the compensation transistor having a gate electrode configured to receive a fourth scan signal.

19. The method for operating a display device of claim 18, wherein the third capacitor stores a voltage corresponding to a threshold voltage of the driving transistor while the compensation transistor is turned on during a non-emission period of the light emitting diode, and the third capacitor is floated while the compensation transistor is turned off during an emission period of the light emitting diode.

* * * * *